US010795886B1

(12) United States Patent
Samdani et al.

(10) Patent No.: US 10,795,886 B1
(45) Date of Patent: Oct. 6, 2020

(54) DYNAMIC QUERY ROUTING SYSTEM

(71) Applicant: TOWNSEND STREET LABS, INC., San Francisco, CA (US)

(72) Inventors: Rajhans Samdani, Belmont, CA (US); Pratyus Patnaik, Los Altos, CA (US); Roopak Venkatakrishnan, Burlingame, CA (US); Nathaniel Ackerman Rook, San Francisco, CA (US); Ankit Goyal, Daly City, CA (US)

(73) Assignee: TOWNSEND STREET LABS, INC., San Francisco, CA (US)

( * ) Notice: Subject to any disclaimer, the term of this patent is extended or adjusted under 35 U.S.C. 154(b) by 234 days.

(21) Appl. No.: 15/942,342

(22) Filed: Mar. 30, 2018

(51) Int. Cl.
G06F 16/33 (2019.01)
G06F 16/2453 (2019.01)
G06N 20/00 (2019.01)

(52) U.S. Cl.
CPC ....... *G06F 16/24539* (2019.01); *G06N 20/00* (2019.01)

(58) Field of Classification Search
CPC .................................................... G06N 20/00
USPC .......................................... 707/706; 706/47
See application file for complete search history.

(56) References Cited

U.S. PATENT DOCUMENTS 6,026,388 A 2/2000 Liddy et al.
8,886,587 B1 * 11/2014 Hainsworth ........... G06N 5/025
706/47

| | | | |
|---|---|---|---|
| 2004/0072143 A1 * | 4/2004 | Timmis ................... | A01C 1/00 435/4 |
| 2004/0243568 A1 | 12/2004 | Wang et al. | |
| 2005/0086046 A1 | 4/2005 | Bennett | |
| 2006/0160065 A1 * | 7/2006 | Timmis ................... | A01C 1/00 435/4 |
| 2008/0052056 A1 * | 2/2008 | Timmis .............. | G06K 9/00147 703/11 |
| 2008/0071769 A1 | 3/2008 | Jagannathan | |
| 2010/0076998 A1 | 3/2010 | Podgorny et al. | |
| 2012/0078890 A1 | 3/2012 | Fan et al. | |
| 2013/0007037 A1 | 1/2013 | Azzam et al. | |
| 2013/0212096 A1 | 8/2013 | Shahar | |

(Continued)

OTHER PUBLICATIONS

Truong, Dennis, "Non-final Office Action dated Dec. 10, 2019", U.S. Appl. No. 15/373,312, The United States Patent and Trademark Office, dated Dec. 10, 2019.

(Continued)

*Primary Examiner* — Baoquoc N To
(74) *Attorney, Agent, or Firm* — Lindauer Law, PLLC

(57) ABSTRACT

A system dynamically routes queries from an organization for processing. An incoming query is classified using a base model to determine a canonical group. The query is routed based on the canonical group. Responsive to the query, response data is then provided to the user device. Event data about the query, the routing, and the response data is used to train a first model that is used to determine subsequent routing. When a threshold is reached with respect to the available event data, a second model is trained using the event data. Processing of subsequent queries using the second model results in reduced demand for computer resources and reduces response times. The second model may be retrained on a schedule, or upon occurrence of a trigger event, such as an addition or removal of a canonical group.

20 Claims, 11 Drawing Sheets

(56) References Cited

U.S. PATENT DOCUMENTS

| | | |
|---|---|---|
| 2014/0040181 A1 | 2/2014 | Kuznetsov |
| 2014/0149411 A1 | 5/2014 | Anand et al. |
| 2014/0172882 A1 | 6/2014 | Clark et al. |
| 2015/0172294 A1 | 6/2015 | Bittner et al. |
| 2016/0034457 A1 | 2/2016 | Bradley et al. |
| 2016/0171373 A1 | 6/2016 | Allen et al. |
| 2016/0180726 A1 | 6/2016 | Ahuja et al. |
| 2016/0335554 A1 | 11/2016 | Koll et al. |
| 2017/0228372 A1 | 8/2017 | Moreno et al. |
| 2017/0242899 A1 | 8/2017 | Jolley et al. |
| 2017/0243107 A1 | 8/2017 | Jolley et al. |
| 2018/0144064 A1 | 5/2018 | Krasadakis |
| 2018/0212904 A1 | 7/2018 | Smullen et al. |
| 2019/0108486 A1* | 4/2019 | Jain ................ G06Q 10/101 |

OTHER PUBLICATIONS

Bowen, Richard L., "Final Office Action dated Apr. 17, 2020", U.S. Appl. No. 15/610,183, The United States Patent and Trademark Office, dated Apr. 17, 2020.

* cited by examiner

DYNAMIC QUERY ROUTING SYSTEM

INCORPORATION BY REFERENCE

The contents of U.S. patent application Ser. No. 15/373,312 filed on Dec. 8, 2016, titled "Request Processing System" are incorporated by reference into the present disclosure.

The contents of U.S. patent application Ser. No. 15/610,183 filed on May 31, 2017, titled "System for Determining and Modifying Deprecated Data Entries" are incorporated by reference into the present disclosure.

BACKGROUND

Individuals within companies or other organizations may submit requests for information or services. The requests may be processed by a variety of systems.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
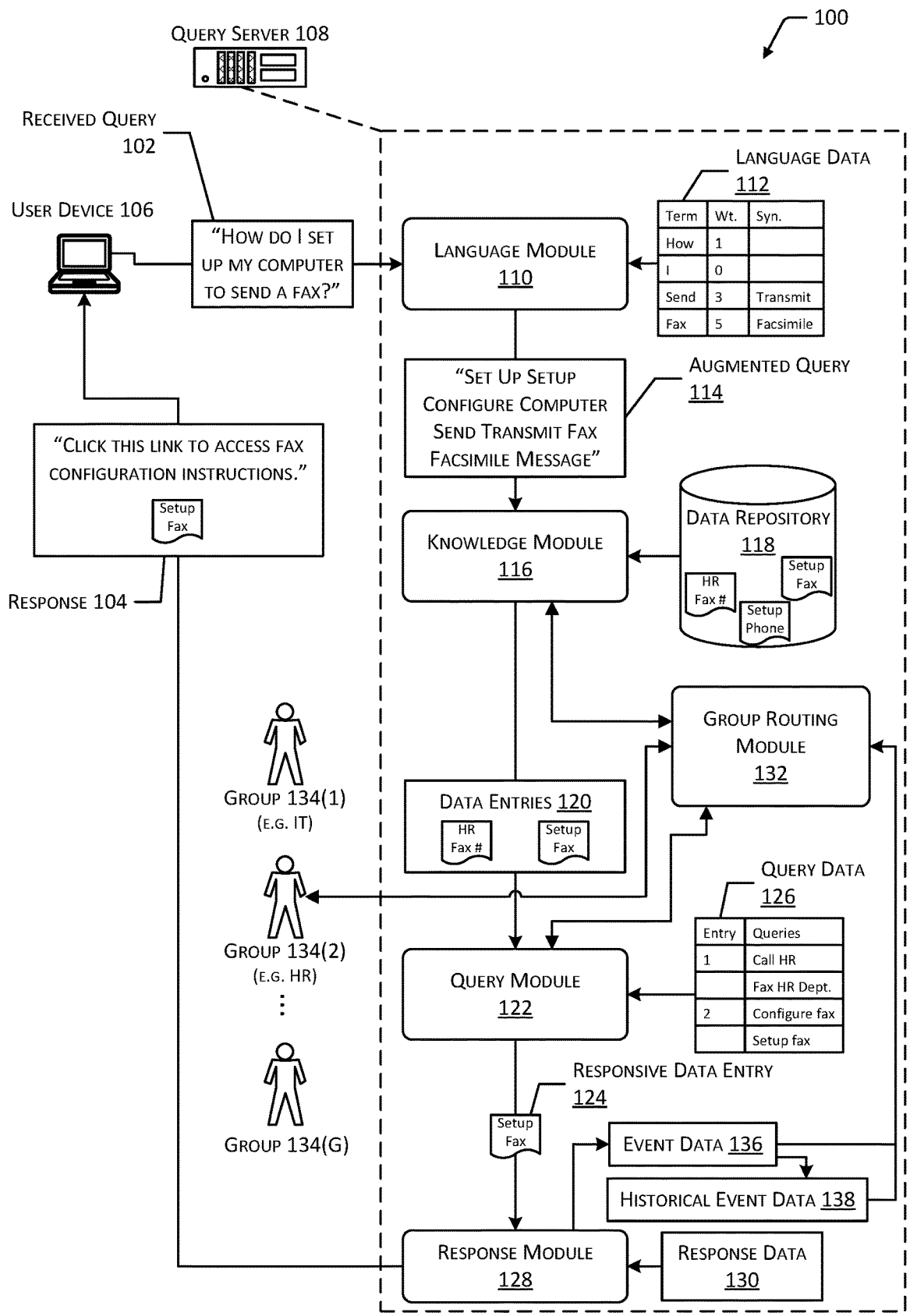
FIGS. 1A and 1B depict a system for dynamically routing queries to a particular group, according to some implementations.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Companies and other organizations may process requests for information or services from a user through various types of partially-automated systems, such as ticketing systems, or by manually processing requests. For example, an employee of a company may electronically submit a query, such as "What is the fax number for the human resources department?", "How do I set up my computer to send faxes?", or "How do I enroll in the company benefits program?". In some cases, the employee may transmit the query, such as through e-mail or a messaging program, to a department or a particular individual associated with the company. In other cases, the employee may transmit the query through a web portal or messaging system to an employee or group of employees responsible for routing messages to appropriate departments or individuals that may address the query. In still other cases, the employee transmitting the request may select or specify a department or individual to receive the request. Periodically, a company may review the queries that were resolved during a period of time and create articles or other sources of knowledge that may be used to answer subsequent queries of a similar nature. For example, if a company receives numerous questions within a month regarding the process for enrolling employees in a benefits program, an individual within the company may generate a web page, article, or other type of data entry that explains this process. During the next month, subsequent queries relating to enrollment in a benefits program may be resolved by directing the employee providing the subsequent query to the existing data entry.

In some cases, queries from a user may be inadvertently directed toward an employee or department that is unable to resolve the query, either by the user submitting the query, other users responsible for routing the query, or an automated system. In other cases, similarities between a current query and one or more previous queries may not be readily apparent, depending on the particular language, grammar, or format of the query. In still other cases, a particular data entry may appear relevant to a received query, such as due to common keywords present in both the data entry and the query, but the data entry may not actually address the question presented by the user.

Described in this disclosure are techniques for routing a query received from a user to a group associated with responding to that query. The query may be received through a messaging system, short message service (SMS), e-mail, a web portal, and so forth. An augmented query may be generated using the received query, such as through use of natural language processing techniques. In some implementations, language data indicative of particular weights applied to certain terms of the query and synonyms of particular query terms may be used to process the received query. For example, a user query may include the text "What is the fax number for the human resources department?". The language data may indicate that certain terms, such as "what", "is", "the", and "for" are unimportant for resolving the query, and thus have a weight of zero. The language data may indicate a high weight value for the terms "fax", "human", and "resources", and a moderate weight value for the terms "number" and "department". Additionally, the language data may indicate synonyms for one or more terms in the query. For example, the language data may indicate that synonyms for the term "fax" may include "facsimile", "scanner", "copier", and so forth. Similarly, the language data may indicate the synonyms "HR" and "H.R." for the terms "human resources". Continuing the example, the received query may be processed to generate an augmented query, such as "fax facsimile scanner copier number human resources HR H.R. department".

To determine an appropriate response to the query, the augmented query may be compared with an existing set of data entries, a set of previously received queries, or both. For example, in some cases, the time or computing resources needed to compare the augmented query with previously received queries within a system may be greater than the time or computing resources needed to compare the augmented query with existing data entries. In such cases, correspondence between the augmented query and the existing data entries may be determined more efficiently than correspondence between the augmented query and the numerous previous queries. Alternatively, the time or computing resources associated with analysis using the data entries may exceed the time or computing resources associated with analysis using the previous queries. In such cases, correspondence between the augmented query and the previously received queries may be determined more efficiently than correspondence between the augmented query and the numerous data entries.

In some implementations, correspondence may be determined by matching keywords found within data entries to keywords within the augmented query. The particular keywords that correspond to a particular data entry and the weight associated with each keyword may be used to determine a correspondence value (e.g., a confidence value). If the correspondence value exceeds a threshold, then the particular data entry may correspond to the augmented query. At least a subset of the existing data entries that correspond to the query may be determined. In other implementations, the determined subset of data entries may include a fixed number of data entries, such as the fifty data entries that have the greatest associated correspondence values. In still other implementations, a combination of a fixed count and a threshold value may be used. For example, fifty-five out of five hundred data entries may be determined to have a correspondence value greater than a threshold value, while the determined subset may include the twenty data entries of those fifty-five that have the greatest correspondence. As another example, the twenty data entries having the greatest correspondence values may be determined, however only sixteen out of the twenty data entries may have a correspondence value greater than a threshold value. Therefore, the determined subset may include those sixteen data entries.

After determining at least a subset of the data entries that correspond to the augmented query, the augmented query may be analyzed using the previous queries for which one or more data entries of the subset was used to resolve the previous query. For example, correspondence between the augmented query and each of the previous queries may be determined. In some implementations, each query that is received and resolved using a data entry may be recorded. Data indicative of a query that is resolved using a particular data entry may be stored in association with data indicative of the data entry. Thus, each data entry of the determined subset may have been used to resolve one or more previous queries. Correspondence between the augmented query and the previous queries associated with the subset of data entries may be used to determine a particular query having a greatest correspondence value compared to the other previous queries. For example, keywords within each of the previous queries may be compared to the keywords of the augmented query to determine a correspondence value. The correspondence value may be determined by the quantity of matched words, the weight of the words that are matched, whether a keyword from the original received query is matched, whether a synonym included in the augmented query is matched, similarities between grammatical arrangements of the received query and a previous query, and so forth. In some cases, words may not necessarily be matched, but may be synonyms of a keyword or associated with keywords. For example, keywords such as "internet" and "wifi" may not be synonyms, but may occur in similar contexts. Continuing the example, a query that includes the term "internet" may correspond to a response that includes the term "wifi". The particular data entry that corresponds to the previous query having the greatest correspondence value may be included in a response to the initial query received from a user. For example, a response to the received query may include all or a portion of the text of the data entry, a link or instructions to access the data entry, and so forth.

In some implementations, if no data entry that corresponds to the augmented query is determined, correspondence may instead be determined between the augmented query and the previous queries received for each data entry. For example, if no correspondence value is determined for any data entry that exceeds a threshold value, no subset of data entries that correspond to the augmented query may be determined. In such a case, a particular previous query may still have keywords or other parameters that correspond to the received query. If correspondence between one or more previous queries and the augmented query is determined, one or more data entries associated with the corresponding previous queries may be relevant to the received query. The data entry associated with the previous query that has the greatest correspondence value may be used to generate a response.

Queries that are resolved using one or more of the techniques described in this disclosure may be stored for future use to analyze and resolve subsequent queries. For example, a first query may be received, and a particular data entry may be used to resolve the first query. Subsequently, a second query that is identical or similar to the first query may be received. Correspondence between the second query and the first query may be determined, and the same data entry may be used to generate a response to the second query. In some implementations, feedback data associated with a response may be determined. For example, a user receiving a response may be requested to indicate whether the response appropriately resolved the received query. If the feedback data corresponds to one or more threshold feedback values, such as an indication that the response was useful, the received query may be stored for future comparison to subsequent queries. If the feedback data deviates from the threshold feedback values, such as by indicating that the response was not useful, a notification requesting human intervention to resolve the query may be generated. In some implementations, if a query is resolved by one or more human users, the resolution by the human user(s) may function as feedback data, indicating that the group to which the query was provided is a suitable destination for subsequent queries having similar parameters. In other implementations, if a query is routed from a first user or group to a second user or group, this routing may function as feedback data indicating that the second user or group is a suitable destination for subsequent queries having similar parameters. Additionally, if the query was resolved by the generation of a data entry, the received query may be stored in association with the generated data entry, such that subsequent queries having similar parameters may be resolved using the generated data entry.

In some implementations, data associated with a received query may be used to determine a source of the query. For example, a query received via SMS may be associated with a telephone number, which may be used to identify a user, device, or account, which in turn may be used to identify a company or other organization associated with the user, device or account. As another example, a query received via a web portal from a computing device within an office may be associated with a network identifier that may be used to identify the device, department, or user account associated with the query. In some cases, particular users may not be authorized to access particular data entries. For example, a user may provide a query requesting restricted information, such as information relating to salaries or bonuses awarded to individuals within a company. Based on a lack of correspondence between the source of the query and security data that associates sources of queries with sources of data entries, it may be determined that the user or account associated with the query is not permitted to access the responsive data entry. In some implementations, a notification indicative of an attempt to access the data entry may be generated and provided to an administrator associated with the data entry. In other implementations, in place of the responsive data entry, the response to the query may include an indication of an individual to be contacted for assistance resolving the query. For example, responsive to a query associated with restricted salary information, a user that is not authorized to access a data entry that includes such information may be provided with an e-mail address of an individual in a company's human resources department that may be able to resolve the query or recommend alternate sources of information.

In other implementations, data indicative of the source of a query may be used to determine particular bodies of data entries that may be used to respond to the query. For example, a system may store data entries from multiple sources, such as respective data repositories containing data entries associated with different companies. In many cases, data entries associated with a first company may not include information that is useful to resolve queries from employees of a second company, independent of any similar keywords or other parameters that are common between a data entry and a query. Additionally, many data entries for a particular company may include information intended to be restricted to individuals associated with the particular company. As such, when a query is received, data indicative of the source of the query may be used to determine a particular device, user, account, or organization associated with the query. Correspondence between the source of the query and security data that associates sources of queries with sources of data entries may be used to determine the particular body of data entries that may be used to respond to the query.

If a query is unable to be resolved automatically, the system may route the query to a group that will provide human intervention to resolve the received query. The group may comprise one or more operators that are associated with performing particular tasks for the company. Groups may provide different types of services or functions, and may be divided into canonical groups such as "information technology", "human resources", "accounting", and so forth. Each organization may have different internal labels or names for these groups.

In some implementations, correspondence may be determined between the keywords or other parameters of the received query and organization data that is specific to the company and indicative of groups, members, functions, and so forth. This correspondence may be used to determine a group that is suitable to receive and resolve the query. For example, a model specific to the company may include data that associates the terms "benefits", "human", "resources", or "HR" with an e-mail address for the human resources department of a company, while the terms "computer", "configure", "set up", or "IT" are associated with the information technology department of the company. If the keywords of the query match the particular terms associated with a group, the query may be provided to that group.

As an organization first starts to use the system, there may not be data entries to generate responses. The system uses dynamic routing to assess the query and attempt to determine which group the query should be routed to. A query may be first processed using a company-specific model. The company-specific model has been trained using event data that is based on the queries, the response data associated with those queries, and which groups responded to those queries. Until a transition threshold is reached, a continuously trained system is used with ongoing real-time or near real-time machine learning techniques to associate queries with appropriate groups. As queries are responded to, event data is generated, and used to promptly retrain the continuously trained model that is associated with that company.

However, during the initial use of the system, the continuously trained model has little or no event data to be trained on, and thus may not provide routing determinations that have a confidence value above a threshold value. The query may then be processed using an initial model. The initial model is a more generalized model that associates particular canonical groups with various aliases or terms. The initial model may be based on anonymized and aggregated information gathered from different organizations. For example, the initial model may associate a canonical group of "information technology" with various aliases or terms such as "helpdesk", "IT support", "IT", "tech", "computer", "FAX", and so forth. The initial model is not specific to a particular organization. In some implementations the initial model may be specific to a particular industry or type of organization. For example, government entities may utilize a first initial model while healthcare organizations may use a second initial model.

The initial model is then used to process the queries that were unable to be routed using the company-specific model. For example, as the system is first brought online and the company-specific model is as-yet untrained, and there are no data entries for responses, the system will use the initial model to assist in routing at least some of the queries to the appropriate groups for the generation of response data. As responses are made and event data generated, the company-specific model is trained. As the training continues to improve the confidence in the output of the company-specific model, more of the subsequent queries are routed based on the company-specific model.

In the event the system is unable to determine a particular group using either the company-specific model or the initial model, the query may be provided to a default destination, such as one or more users responsible for routing queries or addressing queries of a general nature. The particular groups that receive and resolve queries may be stored as additional group data, so that subsequent queries having similar parameters may be provided to the same groups. In some cases, a response provided by a user or group of users may be stored in association with an indication of the query, such that the response may be provided responsive to subsequent queries having similar parameters.

Returning to the continuously trained system, such a system provides advantages during early use of the system by an organization. These advantages include quickly learning which groups to route queries to, and subsequently reducing consumption of resources to re-route erroneously routed queries, reducing waste in resources due to responses from groups not associated with those queries who received the query in error, and so forth.

During operation, the continuously trained system, in order to support incremental training may not be able to implement some machine learning algorithms. For example, a deep convolutional neural network may not support incremental on-line training. Additionally, the continuously trained system may require processor and network bandwidth intensive operations during use. For example, when predicting a group associated with a query, the system may fetch a company-specific model from a datastore, consuming network bandwidth. As the model increases in complexity, it increases in size, also increasing the bandwidth used. The model is then deserialized, which consumes significant computational resources. The model, now deserialized, is processed to generate a prediction as to the group associated with the query. Once event data associated with a query is received, the model is then fetched from the datastore, deserialized, trained, serialized, and transferred to the datastore for storage.

During operation the continuously trained system may result in large models being stored in the system datastore, which may meet or exceed storage limits. This increased datastore size also makes overall operation of the system cumbersome. These storage limits and the size of the models may impose limits, such as supporting fewer than 50 groups during operation. Additionally, a race condition may occur if there are several training events happening simultaneously. Various techniques may be used to prevent a race condition from overwriting data, but these techniques further increase the complexity and computational cost of the system, increasing latency associated with operation of the continuously trained system.

During operation, the system may determine characteristic data. The characteristic data comprises information that is indicative of operation of the system with respect to a particular organization, or portion thereof. For example, the characteristic data may be indicative of one or more of a count of queries processed by the system for that organization, a count of queries processed by the system for that organization that are associated with a particular group in that organization, a count of queries that are routed using one of the company-specific models, a length of time since use of the system by the organization began, and so forth. A transition threshold may be specified for a particular value of characteristic data. Once the characteristic data of the system exceeds that transition threshold, the system may transition to using a company-specific batch trained system.

The company-specific batch trained system may utilize machine learning techniques to generate a batch trained model using historical event data. The machine learning techniques used by the batch trained system may be the same as, or different from, the continuously trained system. In one implementation, the batch trained system may be trained using all available event data (or a subset thereof designated for training) to generate the batch trained model. Generation of the batch trained model may be limited to longer time intervals compared to the continuously trained system. For example, the batch trained model may be generated once daily, rather than continuously. Generation of the batch trained model may be done at other times. For example, responsive to a deletion of a group or addition of a group from an organization, the batch trained system may be trained using the historical event data and generate a new batch trained model.

The batch trained system offers several advantages over the continuously trained system. The batch trained model may be stored and accessed differently, removing the need for a fetch over a network and deserialization. As a result, latency and bandwidth usage are decreased. The batch trained system also does not encounter the race condition issues described above. The batch trained system is also more scalable, allowing for many more groups to be supported compared to the continuously trained system.

By using the techniques described in this disclosure, the system is able to quickly begin routing requests to appropriate groups. The initial system using the initial model helps direct at least some of the incoming queries to appropriate groups of the organization during the early stages of usage. As event data is subsequently generated and the continuously trained system begins to generate high confidence routing decisions for queries, the initial system is less relied upon in favor of the selections made by the continuously trained system. As the characteristic data indicates a transition threshold has been reached, the system then transitions to using the batch trained system. As a result, the system is able to seamlessly provide service to users while minimizing resource usage and continuing to improve the accuracy of the responses.

Illustrative System

Figure 1B:
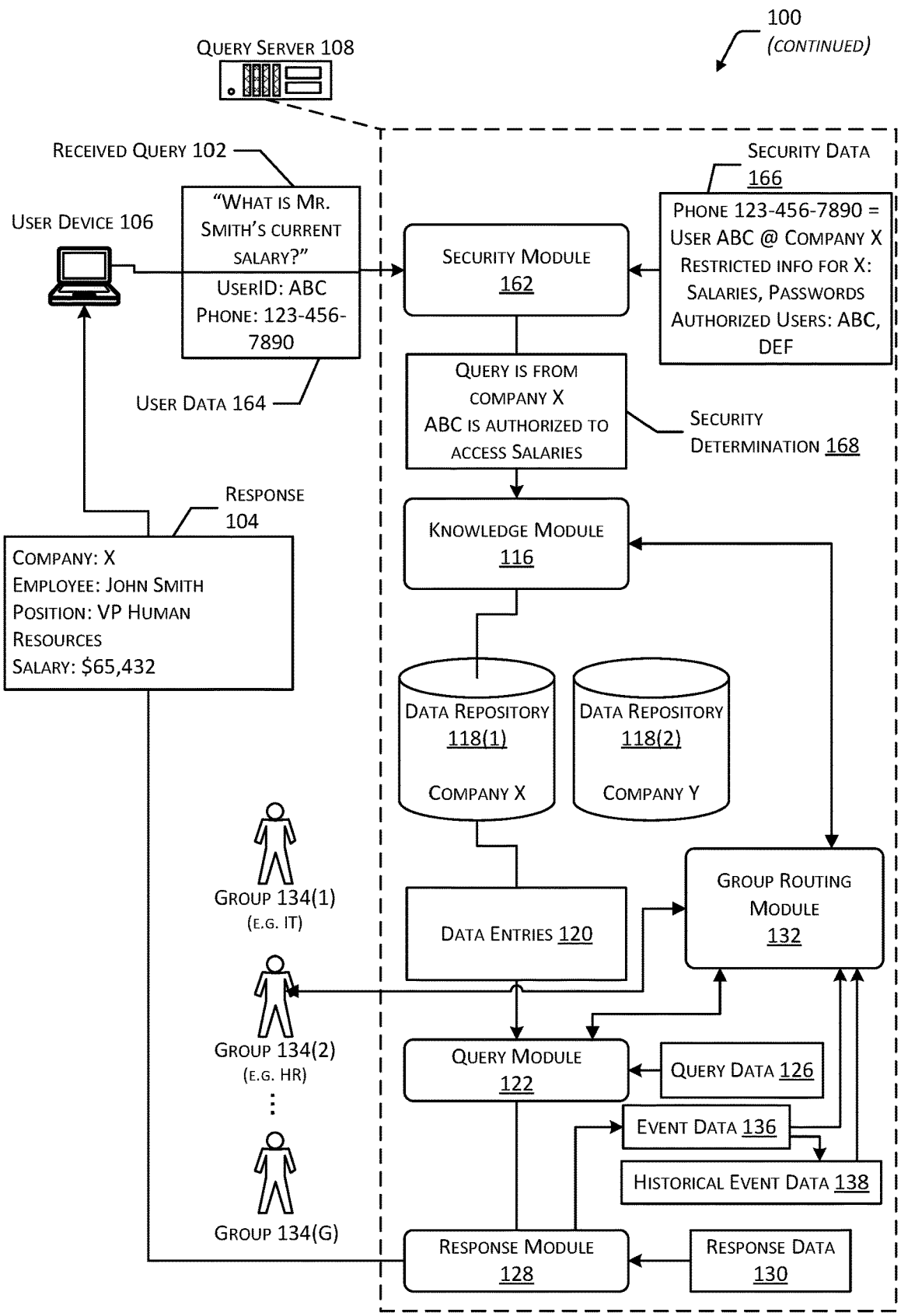

FIGS. 1A and 1B depict a system 100 for dynamically routing and processing a received query 102 to generate a response 104, according to some implementations. The received query 102 may include, for example, a request for information, one or more services, and so forth. For example, a user within a company or other organization may access a user device 106 to generate a query, which may be provided from the user device 106 to a query server 108 for processing. The user device 106 may include any type of computing device including, without limitation, a smartphone, tablet computer, wearable computer, or other type of mobile or portable device, a desktop computer, laptop computer, or other type of personal computer, an automotive computer, a set-top box, a server, a game controller, and so forth. While FIG. 1 depicts a single user device 106 providing the received query 102 directly to the query server 108, in other implementations, the user device 106 may include multiple computing devices, or the user device 106 may provide the received query 102 to one or more intermediate computing devices, access points, and so forth, which in turn provide the received query 102 to the query server 108. Additionally, while FIG. 1 depicts a single query server 108 receiving the received query 102, the query server 108 may include any number and any type of computing devices including, without limitation, the types of computing devices described with regard to the user device 106. The received query 102 may include any manner of data including, without limitation, alphanumeric data, audio data, image data, and so forth. For example, FIG. 1 depicts the received query 102 including the text "How do I set up my computer to send a fax?", which may be input using a keyboard, touch sensor, or other input device associated with the user device 106. In other implementations, the received query 102 may be input using a microphone in conjunction with speech-to-text software or a camera or other image sensor in conjunction with optical character recognition software.

The received query 102 may include various parameters, such as keywords having a particular arrangement, such as a grammatical structure or format. For example, the received query 102 may include a question or statement expressed in natural language. The parameters of the received query 102 may include the particular words used in the query, the arrangement of the words, the formatting of one or more words, additional characters such as punctuation, and so forth. For example, a terminal question mark may indicate that the received query 102 includes a question, the presence of intermediate periods or a word containing all capital letters may indicate that one or more terms within the received query 102 include an abbreviation or acronym, or the presence of a capitalized word within the received query 102 may indicate that the particular word is a proper noun.

A language module 110 associated with the query server 108 may process the received query 102 using language data 112, to generate an augmented query 114. The language data 112 may associate various keywords or other parameters of queries with weight values. For example, words that are unlikely to indicate the nature of a received query 102, or words that are likely to be common to a large number of unrelated queries, such as "I", "my", "to", and "a" may be assigned a low weight value, or a weight value of zero. Continuing the example, words having a weight value of zero may be disregarded or omitted from the augmented query 114. Conversely, words that are likely to indicate the nature of the received query 102 or words that are less likely to be included in a large number of other queries may be assigned a high weight value. Similarly, words that are moderately likely to indicate the nature of the received query 102 may be assigned a moderate weight value. As an illustrative example, FIG. 1 depicts the language data 112 assigning a weight value of "1" to the query term "How", a weight value of "0" to the query term "I", a weight value of "3" to the query term "Send", and a weight value of "5" to the query term "Fax". Continuing the example, in the received query 102 "How do I set up my computer to send a fax?", the term "I" does not identify the nature of the received query 102 and would be likely to occur in a large number of other unrelated queries, and is thus assigned a weight value of zero. The term "How" indicates that the received query 102 relates to a request for instructions to accomplish a task, but does not indicate the nature of the query and is likely to occur in other unrelated queries, and is thus assigned a weight value of one. The term "Send" is moderately indicative of the nature of the received query 102 and moderately likely to occur in other queries, and is thus assigned a weight value of three. The term "Fax" is highly indicative of the nature of the received query 102 and is only likely to occur in other queries relating to the transmission or configuration of a fax, and is thus assigned a weight value of five. Other terms of the received query 102 may similarly be included in the language data 112 and associated with a weight value. Words in the received query 102 that are not included in the language data 112 may be assigned a default weight value. In some implementations, the arrangement, punctuation, formatting, and so forth of particular words within the received query 102 may also be assigned a weight value.

The language data 112 may also indicate one or more synonyms associated with particular keywords within the received query 102. For example, the language data 112 may indicate the term "Transmit" is a synonym for the term "Send", the terms "Facsimile" and "Message" are synonyms for the term "Fax", the terms "Setup" and "Configure" are synonyms for the terms "Set Up", and so forth. When determining a response 104 that corresponds to the received query 102, the determined synonyms may also be used to locate corresponding materials for inclusion in the response 104. In some implementations, a single synonym may be associated with multiple words within the received query 102, such as the synonym "Configure" for the terms "Set Up". Similarly, multiple synonyms may correspond to a single term of the query, such as the synonyms "Facsimile" and "Message" for the query term "Fax".

The augmented query 114 may be generated by removing one or more terms from the received query 102 that have a weight value less than a threshold value. For example, the terms "How", "Do", "I", "My", "To", and "A" may have a weight value of zero, or a weight value less than a threshold value, such as three. The augmented query 114 may also include one or more of the synonyms determined to correspond to the terms of the received query 102. For example, in addition to the initial terms of the received query 102, the augmented query 114 may include the synonyms "Setup", "Configure", "Transmit", "Facsimile", and "Message". As a result, the initial received query 102 of "How do I set up my computer to send a fax?" may be used to generate the augmented query 114 of "Set Up Setup Configure Computer Send Transmit Fax Facsimile Message". In some implementations, the augmented query 114 may include additional data indicative of the weight values of each term included therein. In other implementations, the augmented query 114 may also include data indicative of other parameters of the received query 102, such as arrangements of words, capitalization, formatting, punctuation, and so forth.

A knowledge module 116 associated with the query server 108 may access a data repository 118 or other source of data entries 120 to determine one or more data entries 120 that correspond to the augmented query 114. A data entry 120 may include alphanumeric data, audio data, image data, or one or more other types of data that may be used to convey information to a user. For example, a data entry 120 may include a document, spreadsheet, database, web page, audio file, video file, one or more images, and so forth. Each data entry 120 within the data repository 118 may include various terms or other parameters. For example, a first data entry 120 may include information for contacting the human resources department of a company via a fax transmission, a second data entry 120 may include information for setting up an office telephone, while a third data entry 120 may include information for setting up an office computer to send and receive fax transmissions. The knowledge module 116 may determine correspondence between the parameters of the augmented query 114 and the parameters of the data entries 120 within the data repository 118 to identify a subset of data entries 120 that correspond to the augmented query 114 and may potentially be used to generate a response 104. For example, the knowledge module 116 may determine that one or more particular data entries 120 share a threshold number of common keywords with the augmented query 114. As another example, the augmented query 114 may include the indication of a weight value for one or more keywords, and the knowledge module 116 may determine a subset of data entries 120 having common keywords with the augmented query 114 that are associated with an aggregate weight value that exceeds a threshold weight value. Continuing the example, a first data entry 120 with the terms "HR" and "Fax" may share the common term "Fax" with the augmented query 114, and the term "Fax" may have a weight value of five. A second data entry 120 with the terms "Setup" and "Phone" may share the common term "Setup" with the augmented query 114, which may have a weight value of three. A third data entry 120 with the terms "Setup" and "Fax" may share both of these terms with the augmented query 114, and the aggregate weight value of these terms may be eight. If the threshold weight value is five, the knowledge module 116 may determine that the first and third data entries 120 have an aggregate weight value equal to or exceeding the threshold weight value. In some implementations, one or more data entries 120 may be accompanied by metadata indicating synonyms or associated parameters that correspond to the data entries 120. For example, a particular data entry 120 may not contain specific keywords found in a query, however, the metadata associated with that data entry 120 may indicate that those specific keywords are related to the data entry 120. Therefore, the data entry 120 may correspond to the augmented query 114 even if the data entry 120 does not contain the particular keywords found in the query.

A query module 122 associated with the query server 108 may process the data entries 120 determined by the knowledge module 116 to determine a particular responsive data entry 124 that may be used to generate the response 104 to the received query 102. The query module 122 may access query data 126, which may include data indicative of previous queries received by the query server 108. The query data 126 may indicate each data entry 120 determined by the knowledge module 116 and one or more previous queries for which a respective data entry 120 was determined to be responsive. As one illustrative example, FIG. 1 depicts the previous queries "Call HR" and "Fax HR Dept." associated with the data entry "HR Fax #", and the previous queries "Configure fax" and "Setup fax" associated with the data entry "Setup Fax". The query module 122 may determine correspondence between the previous queries for each data entry 120 determined by the knowledge module 116 and one or more of the augmented query 114 or the received query 102. For example, the query module 122 may determine common terms shared by one or more previous queries and the augmented query 114. In some implementations, the query module 122 may determine an aggregate weight value for the terms shared by each previous query and the augmented query 114 or received query 102. In one specific implementation, based on correspondence between the query data 126 and the augmented query 114 or received query 102, the query module 122 may determine a particular previous query that is more similar to the augmented query 114 or received query 102 than other previous queries associated with the data entries 120. The responsive data entry 124 may be the particular data entry 120 that is associated with the particular previous query most similar to the augmented query 114 or received query 102. In other implementations, the query module 122 may determine correspondence values associated with at least a portion of the previous queries that are associated with the data entries 120 determined by the knowledge module 116. The particular responsive data entry 124 may be determined based on a combination of the correspondence value for that data entry determined by the knowledge module 116 and the correspondence values for the associated previous queries determined by the query module 122.

In some implementations, if no particular previous query corresponds to the augmented query 114 or received query 102, a group routing module 132 may be used to determine which group 134 the received query 102 is to be directed to for resolution. For example, if the aggregate weight value for the terms shared by each previous query and the augmented query 114 is less than a threshold value, the group routing module 132 may be used to route the received query 102 to one of the groups 134 associated with that organization. In other implementations, if no particular previous query corresponds to the augmented query 114 or received query 102, the group routing module 132 may be used to route the received query 102 to one of the groups 134 associated with that organization.

The group 134 may comprise one or more human members who are tasked with responding to received queries 102. Members of the group 134 may access the received queries 102 and generate response data 130 using computing devices, such as the user devices 106.

As described below, the group routing module 132 may use several different systems with different models to determine which group 134 to route a query to.

A response module 128 associated with the query server 108 may generate the response 104 based on the responsive data entry 124 and response data 130, which may indicate the manner in which a response 104 is to be formatted or transmitted, other data for inclusion in the response 104, and so forth. For example, the response data 130 may indicate that the instructions "Click this link to access fax configuration instructions" are to be included in a response 104 associated with the particular data entry 120 "Setup Fax". The response data 130 may also indicate particular images or links to be included, the placement and formatting of such elements, and so forth. In cases where the response data 130 does not include content or formatting specific to a particular data entry 120, the response data 130 may include default content. For example, in the absence of response data 130 for a particular data entry 120, the text of the data entry 120, itself, may be provided to the user device 106 as the response 104.

The response module 128 may generate event data 136 for each received query 102. The event data 136 may include at least a portion of the received query 102, and data indicative of the group 134 that provided the response data 130. In some implementations the event data 136 may include data indicative of the response data 130. For example, the event data 136 may include the query text "How do I set up my computer to send a fax?", the response of "Click this link to access fax configuration instructions", and data that indicates that the response was created by a member of the "information technology" group 134. In another example, the event data 136 may comprise information such as a query identifier that indicates a particular received query 102 and a group identifier indicative of a particular group 134. In some implementations the event data 136 may be generated for groups or other aggregated arrangements of received queries 102.

The event data 136 associated with a particular organization may be consolidated into historical event data 138 for that organization. For example, the historical event data 138 may comprise the event data 136 associated with received queries 102 made by users associated with the XYZ Inc. In some implementations the historical event data 138 may comprise all event data 136 for that organization since use of the system began. In other implementations the historical event data 138 may comprise a subset of all the event data 136 since use of the system began. In some implementations the historical event data 138 may be limited to a last k events associated with a particular group 134, wherein k is a non-zero integer number. As described below, one or more of the event data 136 or the historical event data 138 that is associated with a particular organization may be used to train one or more of the models used by the group routing module 132 to route received queries 102 to a group 134.

In some implementations event data 136 or historical event data 138 from a plurality of organizations may be aggregated and used to inform canonical group data that may be used by an initial model, as described below.

FIG. 1B depicts another implementation of the system 100 for dynamically routing and processing a received query 102, according to some implementations. As described with regard to FIG. 1A, a user device 106 may provide a query to a query server 108. For example, the received query 102 may include the text "What is Mr. Smith's current salary?". In some cases, a received query 102 may be associated with restricted or confidential information. For example, access to information associated with employee salaries, passwords, account information, and so forth, may be restricted to particular users. In other cases, access to information contained within a particular data repository 118 may be restricted to particular users or groups of users, such as employees of a particular company or of a particular department within a company. Additionally, in some cases, the system 100 may include multiple data repositories 118 or other sources of data entries 120. For example, a first data repository 118(1) may store data entries 120 associated with a first company while a second data repository 118(2) stores data entries 120 associated with a second company. The information contained in data entries 120 associated with one company may not be useful to employees of other companies. Furthermore, information contained within data entries 120 associated with a particular company may be restricted, confidential, private, proprietary, and so forth, and may be intended to be viewed only by users associated with the particular company.

In some implementations, prior to generation of a response 104, a received query 102 may be provided to a security module 162 associated with the query server 108. The security module 162 may determine correspondence between user data 164 associated with the received query 102 and security data 166. The user data 164 may include data indicative of a source of the received query 102, such as a particular user device 106, user account, company, location, and so forth. For example, the user data 164 may include a user identifier, such as a user name or account name, a device identifier, a token value, or other type of identifier. As another example, the user data 164 may include a telephone number, e-mail address, an Internet Protocol (IP) address or another type of network address, and so forth. The security data 166 may indicate particular elements of user data 164 that are indicative of users permitted to access particular data repositories 118. For example, the security data 166 may indicate that one or more particular telephone numbers that may be determined from the user data 164 are associated with a particular company. Based on correspondence between the telephone number associated with a received query 102 and the security data 166, a particular data repository 118 associated with a particular company may be queried. Additionally, the security data 166 may indicate that one or more particular user accounts are authorized to access particular data entries 120, data repositories 118, or other types of information. Based on correspondence between the security data 166 and the user data 164, access may be granted to the requested data. In some implementations, if the user data 164 does not correspond to the security data 166, one or more notifications indicative of the attempted access may be provided to the user device 106 or to an administrator associated with the system 100. For example, a user that is not authorized to access a particular data entry 120 may be provided with a response 104 indicating an individual that the user should contact to resolve the query, rather than a response 104 containing information from the data entry 120.

Based on the user data 164 associated with the received query 102 and the security data 166, the security module 162 may generate a security determination 168 indicative of the particular data repository 118 to be queried, and whether the user device 106 is permitted to access the particular data repository 118. For example, based on the telephone number determined from the user data 164, the security determination 168 may indicate that the user device 106 providing the received query 102 is associated with a particular user (e.g., user "ABC") of a particular company (e.g., "Company X"). The security data 166 may further indicate particular types of restricted data, such as data associated with salaries and passwords. In other implementations, the security data 166 may indicate particular data repositories 118 or data entries 120 for which access is restricted. Correspondence between the user data 164 and the security data 166 may indicate that the user device 106 is authorized to access particular data repositories 118, data entries 120, or types of data. If the user data 164 associated with a received query 102 does not correspond to the security data 166, access to a particular data repository 118 or data entry 120 may be denied. In some cases, a notification indicative of the attempted access may be provided to an administrator of the system 100. In other cases, the response 104 provided to the user device 106 may include contact information associated with a human that may assist in resolving the query rather than content associated with a restricted data entry 120. For example, the group routing module 132 may determine a group 134, and the contact information for this group 134 may be provided to the user device 106.

Based in part on the security determination 168, the knowledge module 116 may access the first data repository 118(1), which may be associated with a company that corresponds to the user data 164 accompanying the received query 102. The knowledge module 116 may determine one or more data entries 120 that correspond to the parameters of the received query 102. In some implementations, a language module 110 may be used to generate an augmented query 114 based on the received query 102, as described with regard to FIG. 1A, and the knowledge module 116 may determine data entries 120 that correspond to the augmented query 114. A query module 122 may determine correspondence between the determined data entries 120 and query data 126 to determine previous queries that are similar to the received query 102. Aggregate correspondence values, based on the correspondence value for each data entry 120 and the correspondence values for each previous query associated with that data entry 120, may be determined. The data entry 120 having the greatest aggregate correspondence value may be used to generate the response 104, based in part on response data 130.

As described above, if the system 100 is unable to generate the response 104 using information in the data repository 118, a group routing module 132 may be used to determine which group 134 the received query 102 is to be directed to for resolution.

Figure 2A:
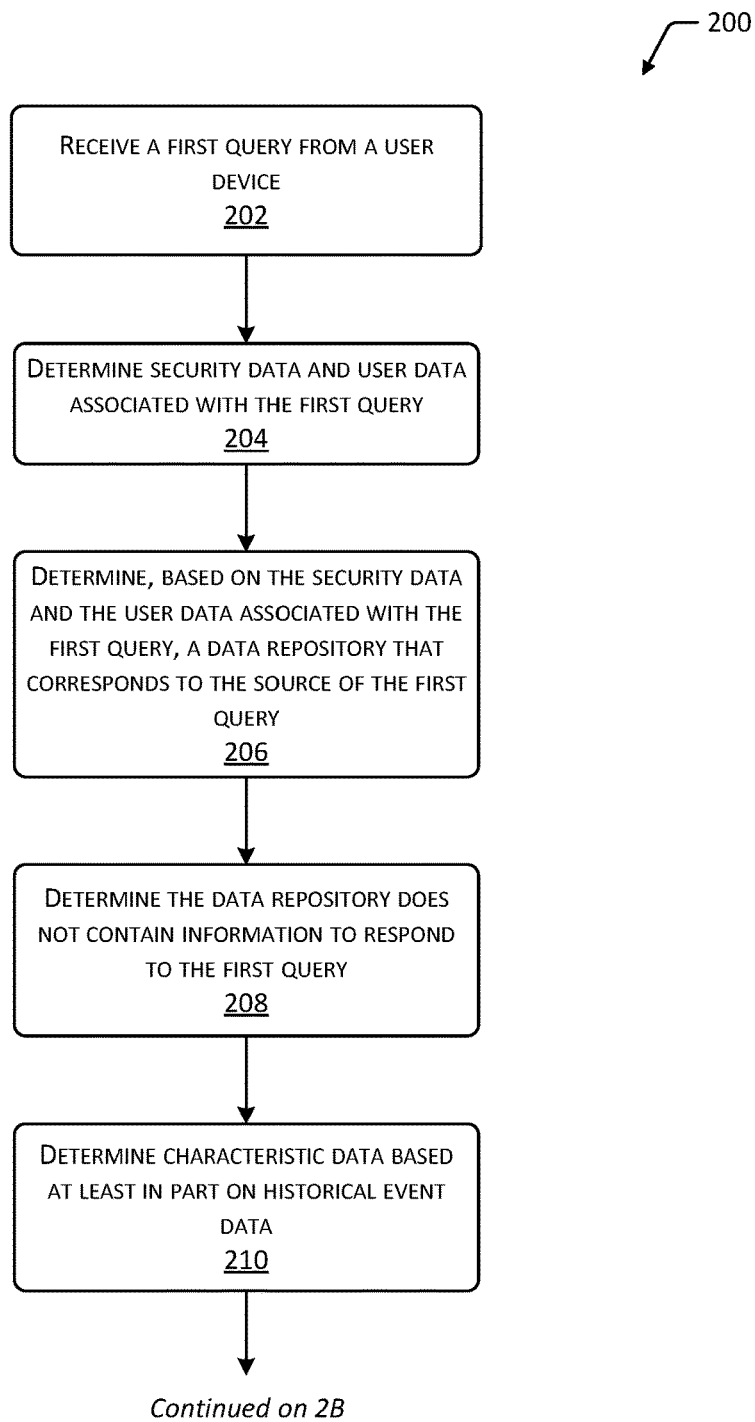
FIGS. 2A and 2B are a flow diagram illustrating a method for dynamically routing queries to particular groups using different models, according to one implementation.
Figure 2B:
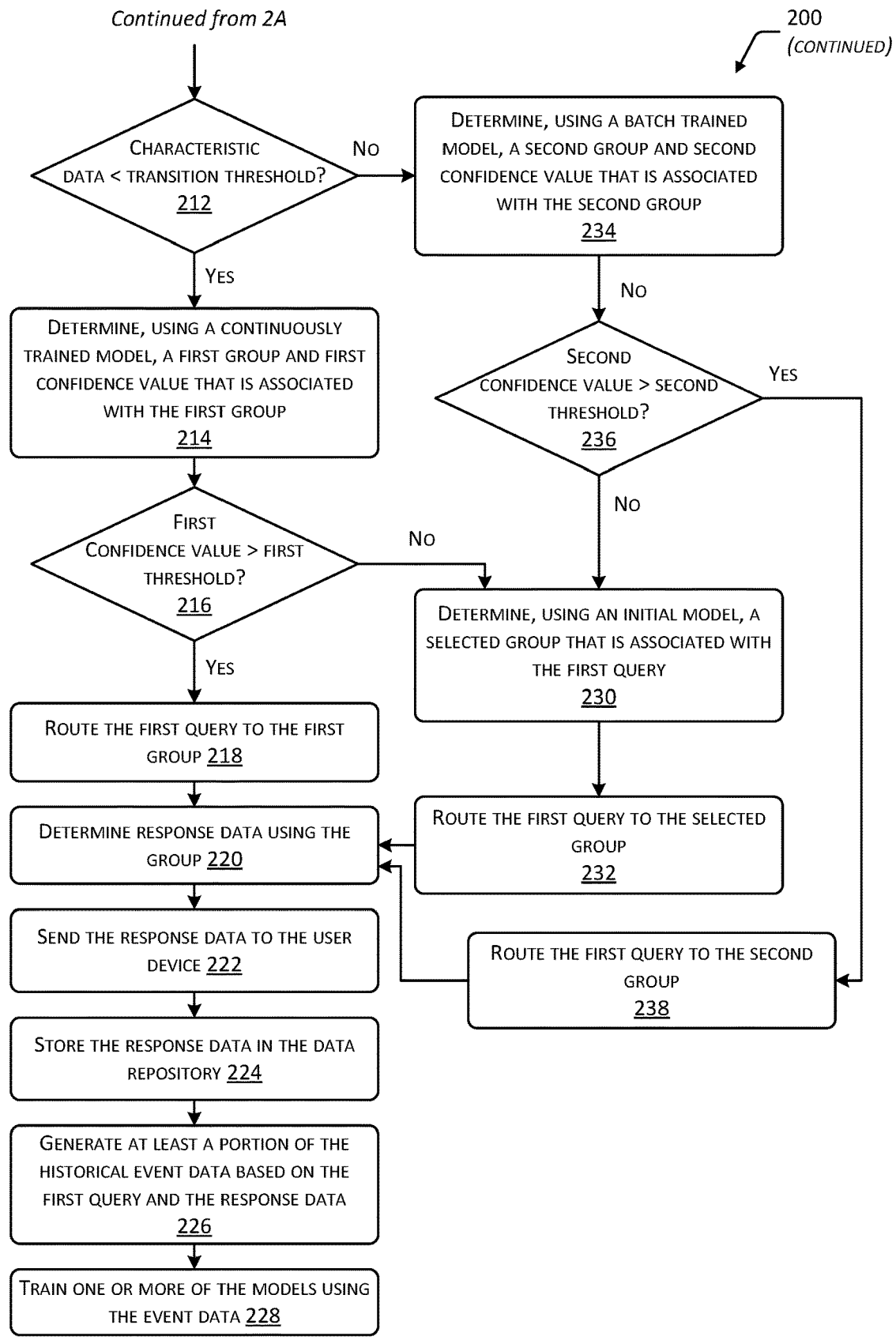

FIGS. 2A and 2B are a flow diagram 200 illustrating a method for dynamically routing queries to particular groups 134 using different models, according to one implementation. In some implementations the method may be performed at least in part by the group routing module 132.

At 202 a first received query 102 is received from a user device 106. The received query 102 may include various parameters, such as keywords, groups of words, arrangements of words, formats of words or letters, punctuation, and so forth.

At 204 security data 166 and user data 164 associated with the first received query 102 is determined. For example, the user data 164 may indicate that the received query 102 is associated with user ID "ABC" and phone number "123-456-7890". The security data 166 may indicate that user ID "ABC" and the phone number "123-456-7890" is authorized to access information associated with company "X".

At 206 based on the security data 166 and the user data 164 associated with the first received query 102, a data repository 118 that corresponds to the source of the first received query 102 is determined. Continuing the example, the data repository 118 may be associated with company "X".

At 208 a determination is made that the data repository 118 does not contain information to respond to the first received query 102. For example, the system 100 as described above with respect to FIGS. 1A and 1B may determine that there are no data entries 120 suitable to provide a response 104, or that a confidence value or weight associated with the proposed responses 104 are below a threshold value.

At 210 characteristic data is determined based at least in part on historical event data 138. The characteristic data comprises information that is indicative of operation of the system with respect to a particular organization, or portion thereof. For example, the characteristic data may be indicative of one or more of a count of queries processed by the system for that organization, a count of queries processed by the system for that organization that are associated with a particular group in that organization, a count of queries that are routed using one of the company-specific models, a length of time since use of the system by the organization began, and so forth. Continuing the example, the characteristic data associated with Company X may be determined to indicate that the system 100 has processed 517 received queries 102.

At 212 a determination is made as to whether the characteristic data is less than a transition threshold. If the characteristic data is less than the transition threshold, the method proceeds to 214.

At 214 a determination is made, using a continuously trained model, a first group and a first confidence value that is associated with the first group. For example, the continuously trained model may use a machine learning algorithm that is updated in real-time or near real-time using the event data 136 from previous received queries 102. The continuously trained model may generate a set of possible groups, with a first confidence value for each group 134 in the set of possible groups. The first confidence value may be indicative of a likelihood that the associated group 134 is correctly determined. The groups 134 in the set of possible groups may be ranked by the first confidence value. The highest ranking group in the set of possible groups may be designated as the first group 134. For example, the highest ranking group 134 may be "information technology".

At 216 a determination is made as to whether the first confidence value is greater than the first threshold. If so, the method proceeds to 218.

At 218 the first received query 102 is routed to the first group 134. Continuing the example, the first received query 102 may be routed to the "information technology" group 134. The routing may comprise sending or otherwise presenting or making accessible at least a portion of the first received query 102 to one or more members of the group 134. For example, the first received query 102 may be presented to the members of the group 134 using one or more user devices 106.

In some situations, the first group 134 may not be appropriate to respond to the first received query 102. For example, the first received query 102 may have been misrouted, responsibilities of the group 134 may have changed, and so forth. A member of the group 134 may re-route the first received query 102 to another group 134.

At 220 the response data 130 is determined using the group 134. For example, a member of the group 134 may provide information that is used to generate the response data 130.

At 222 the response 104 based on the response data 130 is sent to the user device 106. For example, the response 104 may comprise directions that answer the received query 102.

At 224 the response data 130 is stored in the data repository 118. For example, the response data 130 may be used to generate data entries 120 that are stored in the data repository 118.

At 226 at least a portion of the historical event data 138 is generated based on the first received query 102 and the response data 130. For example, the response data 130 may comprise information indicative of the group 134 that provided the response data 130 or is otherwise associated with responding to the received query 102.

At 228 one or more of the models of the system 100 are trained using the event data 136. For example, the continuously trained model may be re-trained using event data 136 as the event data 136 is generated. In another example, the batch trained model may use the historical event data 138 to generate a new batch trained model.

Returning to 216, if the first confidence value is less than or equal to the first threshold, the method proceeds to 230. At 230 a determination is made, using an initial model of a selected group that is associated with the first received query 102. The initial model may be used to determine a match or correspondence value between terms associated with a canonical group and those terms presented in the first received query 102. For example, if the first received query 102 includes the word "FAX" and one of the terms associated with the canonical group is "FAX" which is associated with the canonical group of "information technology", the first received query 102 may be associated with the canonical group "information technology".

While the continuously trained model and the batch trained model are specific to a particular organization or portion of an organization, the initial model may be based at least in part on historical event data 138 from a plurality of organizations. The data so used may be anonymized and confidential or sensitive information removed. For example, the historical event data 138 may be assessed and only those terms that exceed a threshold number of occurrences in more than a threshold number of organizations may be incorporated into the initial model.

In some implementations the initial model is used to generate a score that is indicative of a correspondence between the terms present in the first received query 102 and the terms associated with the canonical group. For example, the score may comprise a weighted sum of a count of terms in the first received query 102 that correspond to terms associated with the canonical group. The selected group 134 may be the canonical group with the greatest score that is associated with the first received query 102.

At 232, the first received query 102 is routed to the selected group 134. Continuing the example, if the selected group is "information technology" the system 100 may then proceed to send the first received query 102 to the members of that group in the organization. The method may then proceed to 220.

Returning to 212, if the characteristic data is determined to be greater than the transition threshold, the method proceeds to 234.

At 234 a determination is made, using a batch trained model, a second group 134 and a second confidence value that is associated with the second group 134. For example, the batch trained model may use a machine learning algorithm with a model that is periodically trained, such as every 24 hours using the historical event data 138. The batch trained model may generate a set of possible groups, with a second confidence value for each group 134 in the set of possible groups. The second confidence value may be indicative of a likelihood that the associated group 134 is correctly determined.

The groups 134 in the set of possible groups may be ranked by the second confidence value. The highest ranking group 134 in the set of possible groups may be designated as the second group 134. For example, the highest ranking group 134 may be "information technology".

At 236 a determination is made as to whether the second confidence value is greater than a second threshold. If not, the method proceeds to 230 and the initial model is used to determine which group 134 to route the received query 102 to. If the second confidence value is greater than the second threshold, the method proceeds to 238.

At 238 the first received query 102 is routed to the second group. Continuing the example, the first received query 102 may be sent to the members associated with the "information technology" group.

As described above with respect to 212, the characteristic data may be compared to a transition threshold to determine whether to use the continuously trained model or the batch trained model. In another implementation, the characteristic data may be representative of other parameters that may be used to determine when to transition between the continuously trained model and the batch trained model.

These parameters may include N, k, minimum time, maximum time, and force train time. In this implementation N represents a total number of events in the historical event data 138 that are associated with the organization and available for training before transitioning from the continuously trained model to the batch trained model. For example, N may be set to a value of 300. In this example while the number of events in the historical event data 138 are less than N=300, the continuously trained model is used to process received queries 102.

Also in this implementation, k represents a total number of events in the historical event data 138 that are associated with the organization and available for training since a previous training of the batch trained model. For example, k becomes meaningful once more than N events suitable for training are present in the historical event data 138. Continuing the example, when N=300 as described above, a value of k=5 may be used. In this case, when number of events exceeds N, one may keep training the batch trained models after every k number of events. This ensures that the batch trained model is reflective of most recent training events.

With this implementation, minimum time specifies a minimum time interval between consecutive training of the batch trained model associated with the organization. Triggering training based only on events may result in training of the batch trained model being initiated frequently, which increases the demand for computer resources. In one implementation, the minimum time may be specified. For example, a minimum time of 15 minutes may be used to provide a gap of at least 15 minutes between consecutive training. With an organization that is generating frequent events, this could result in a latency of approximately 30 minutes, assuming 15 minutes for the minimum time and 15 minutes to perform the training of the batch trained model.

In this implementation, the maximum time specifies a maximum time interval between consecutive training of the batch trained model for the organization. In one implementation, the maximum time interval may be set to 2 hours. If at least one event takes place during that 2 hour maximum time interval, retraining of the batch trained model using the historical event data 138 would be initiated.

The implementation may also specify a force train time. The force train time specifies a time after which the batch trained model is trained. For example, this may be used to force a retraining as needed to correct problems with the batch trained model. When used, if the time that the batch trained model was last trained is greater than the force train time, training of the batch trained model is triggered.

As described above, the transition between the use of the continuously trained model and the batch trained model may be determined using characteristic data. This transition may be illustrated using a total number of events "n" in the historical event data 138 that are suitable for use in training, and with "k" indicating the number of queries in the historical event data 138 since the last training.

The following example illustrates the determination of when to transition between the continuously trained model and the batch trained model. Given a fixed value of k of 5, and that the batch trained model has trained on a first n events, the next training may be triggered when n+k queries are available in the historical event data 138. As described above, the continuously trained model is trained using event data 136 for the received queries 102.

A comparison may be made between the continuously trained model and the batch trained model. This comparison may consider the question "what is the probability that the batch trained model will make a routing mistake for any query between n+1 to n+k, which the continuously trained model would route correctly?". A related question is "what is the probability that an n+j'th query is routed correctly in the continuously trained model but would route incorrectly using the batch trained model for values of j in 1 . . . k?".

For the purpose of this example, assume that the received query 102 arrives randomly. The answer to the above question is approximately: (j−1/n). Consider that the chance that a n+j'th query has something in common with one of the queries from n+1 to n+j−1, but has nothing in common with queries from 1 to n. In this situation, the answer to the first question may be approximately expressed as:

$$P(n, k) = \sum_{j=1}^{k} (j-1)/n = k(k-1)/2n \qquad \text{EQUATION 1}$$

By using equation 1, it is possible to determine a proposed value of n given a specified value of P(n,k). For example, given a specification to have P(n, k) less than a predetermined fraction "x", the equation may be reduced to n=k(k−1)/2x. Continuing the example, if k=5 and x=0.033, then n=300. In another example, if k=3, and x=0.01, then n=300.

By using the method described above, the system 100 is able to quickly begin processing received queries 102 and effectively route those received queries 102 to appropriate groups 134 for response. The initial model dominates during early usage, and as more event data 136 is collected, the training of the continuously trained model improves and handles more of the received queries 102. As the system 100 reaches the transition threshold, the group routing module 132 transitions to using the batch trained model, allowing for seamless growth without service interruption to the organization. As the batch trained model continues to be trained using historical event data 138 that includes recent event data 136, the batch model may continue to improve in accuracy and adjust for changes within the organization.

Figure 3:
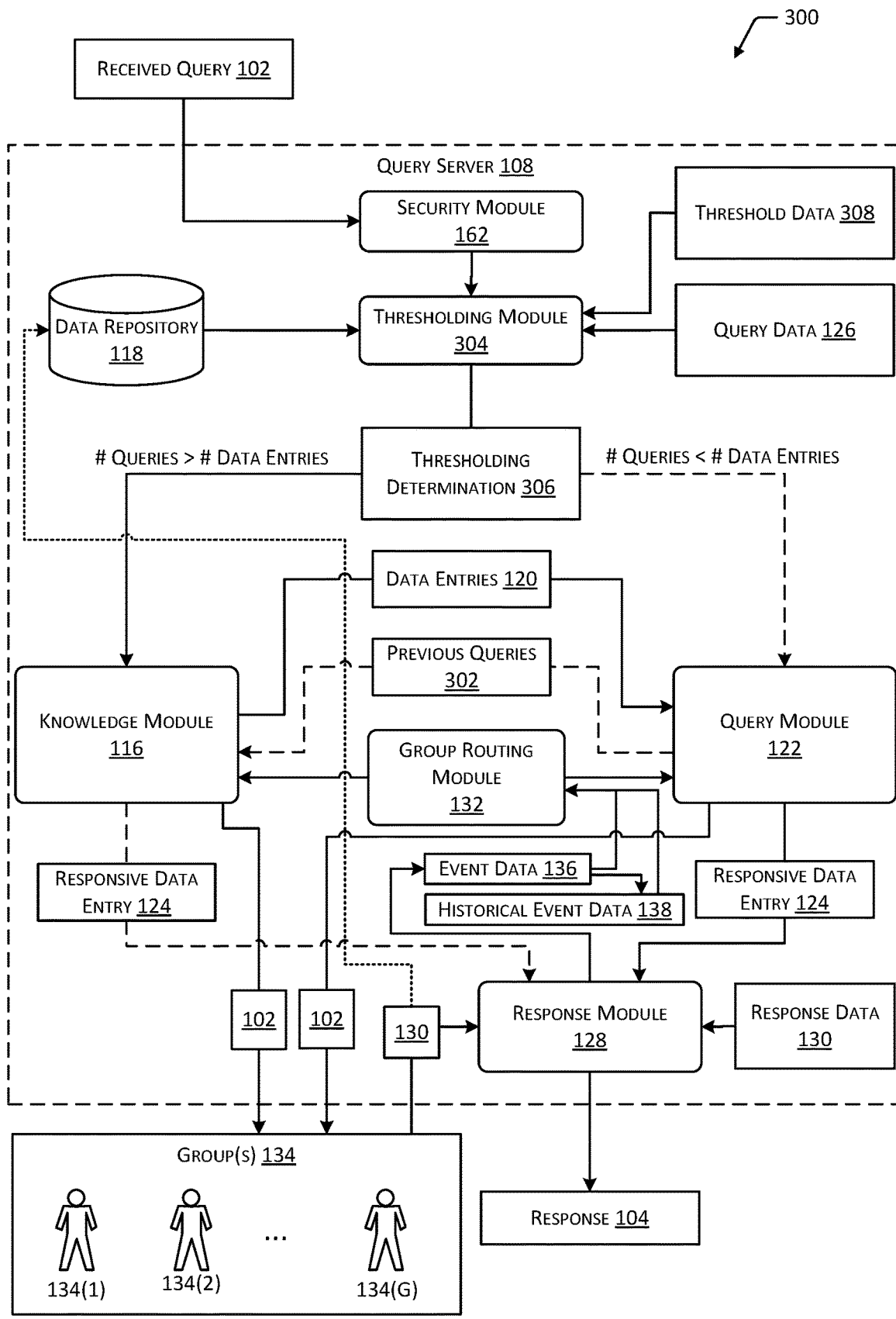
FIG. 3 depicts a system for determining a manner in which a response to a previous query may be routed and generated, according to one implementation.

FIG. 3 depicts a system 300 for determining a manner in which a response 104 to a received query 102 may be generated, according to one implementation. As described with regard to FIGS. 1A and 1B, a query may be provided from a user device 106 to a query server 108, which may process the received query 102 to generate a response 104. As also described above, a security module 162 may be used to determine which data repository 118 or portions thereof, if any, the user is permitted access to.

In some implementations, a thresholding module 304 associated with the query server 108 may determine the manner in which the received query 102 is processed. For example, the thresholding module 304 may determine a current quantity of data entries 120 within a data repository 118 that may be analyzed for correspondence to the received query 102. The thresholding module 304 may also determine, based on query data 126, a current quantity of previous queries 302 associated with the data entries 120. As discussed above, if the number of existing data entries 120 exceeds the number of previous queries 302, it may be more efficient to first determine correspondence between the received query 102 and the smaller number of previous queries 302 to determine a subset of previous queries 302 that correspond to the received query 102. Then, correspondence between the received query 102 and the data entries 120 associated with the subset of previous queries 302 may be determined. If the number of previous queries 302 exceeds the number of data entries 120, it may be more efficient to first determine correspondence between the received query 102 and the data entries 120 to determine a subset of data entries 120 that correspond to the received query 102. Then, correspondence between the received query 102 and the previous queries 302 associated with the subset of data entries 120 may be determined. In other implementations, an efficiency value associated with processing of the data entries 120 or previous queries 302 may be determined in place of or in addition to determining a number of data entries 120 or previous queries 302. For example, based on the size or format associated with one or more data entries 120, determining correspondence between the data entries 120 and a received query 102 may be more efficient than determining correspondence between the received query 102 and previous queries 302, independent of the number of data entries 120 or previous queries 302.

The thresholding module 304 may generate a thresholding determination 306, indicative of whether the received query 102 will first be processed by the knowledge module 116 or the query module 122. As described with regard to FIG. 1, the knowledge module 116 may determine correspondence between the received query 102 and the data entries 120 within the data repository 118. The query module 122 may determine correspondence between the received query 102 and the previous queries 302 of the query data 126. In some implementations, the thresholding module 304 may generate the thresholding determination 306 based at least in part on threshold data 308. The threshold data 308 may indicate one or more relationships between the data entries 120 and the previous queries 302 that may determine the manner in which a received query 102 may be processed with the greatest efficiency. For example, in some cases, due to the size or format of at least a portion of the data entries 120, determining correspondence between a received query 102 and a large number of data entries 120 may be accomplished more quickly than determining correspondence between a received query 102 and a smaller number of previous queries 302. The threshold data 308 may indicate the extent to which the number of data entries 120 may exceed the number of previous queries 302 before determining correspondence between the received query 102 and the previous queries 302 may be accomplished with greater efficiency than determining correspondence between the received query 102 and the data entries 120. In other cases, determining correspondence between the received query 102 and a large number of previous queries 302 may be accomplished more quickly than determining correspondence between the received query 102 and a smaller number of data entries 120. In some implementations, the threshold data 308 may include one or more user-selected or default values. In other implementations, the threshold data 308 may be automatically or dynamically modified as additional data entries 120 and previous queries 302 are stored, based on the characteristics of each data entry 120 and previous query 302.

In cases where correspondence between a received query 102 and the data entries 120 may be determined more efficiently than correspondence between the received query 102 and the previous queries 302, the received query 102 may first be processed by the knowledge module 116. The knowledge module 116 may determine correspondence between the received query 102 and the data entries 120 in the data repository 118 to determine at least a subset of the data entries 120 that may be used to generate a response 104. The query module 122 may then determine the previous queries 302 that are associated with the subset of the data entries 120, and determine correspondence between those previous queries 302 and the received query 102. The correspondence values associated with the previous queries 302 and those associated with the data entries 120 may be used to identify the particular data entry 120 having the greatest total correspondence value, which may be included in a response 104 generated by the response module 128.

In cases where correspondence between a received query 102 and the previous queries 302 may be determined more efficiently than correspondence between the received query 102 and the data entries 120, the received query 102 may first be processed by the query module 122. The query module 122 may determine correspondence between parameters of the received query 102 and parameters of one or more previous queries 302 received by the query server 108. The knowledge module 116 may then determine the particular data entries 120 that correspond to the previous queries 302 identified by the query module 122. Based on correspondence between the received query 102 and the particular data entries 120 and between the received query 102 and the previous queries 302, a responsive data entry 124 having the greatest correspondence value may be determined. The response module 128 may generate a response 104 based on the responsive data entry 124.

If the system is unable to determine the response data 130 or determine response data 130 that exhibits a correspondence that exceeds a threshold value, the group routing module 132 may be used to determine which group 134 the received query 102 is to be directed to for resolution. The received query 102 may then be routed to the group 134. Subsequently, one or more of the event data 136 or the historical event data 138 may be used to train one or more of the continuously trained model or the batch trained model.

Figure 4:
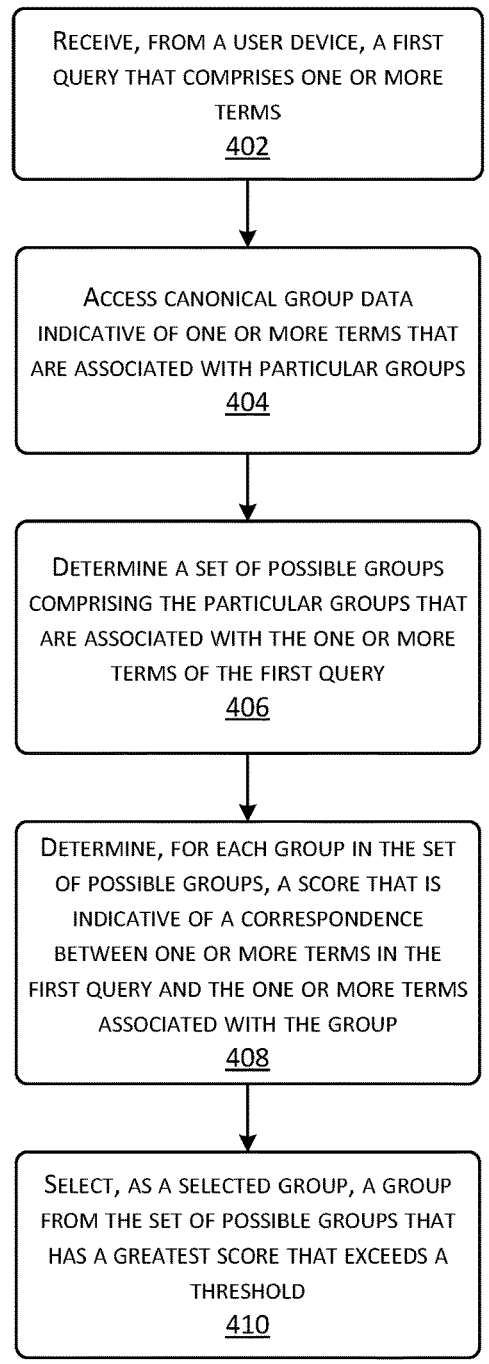
FIG. 4 is a flow diagram illustrating a method of using an initial model to select a group, according to one implementation.

FIG. 4 is a flow diagram 400 illustrating a method of using an initial model to select a group, according to one implementation. The method may be implemented at least in part by the group routing module 132.

At 402 a first query 102 is received from a user device 106. The received query 102 may include various parameters, such as keywords, groups of words, arrangements of words, formats of words or letters, punctuation, and so forth.

At 404 canonical group data is accessed. The canonical group data is indicative of one or more canonical groups and terms associated with those canonical groups. The canonical group data is discussed in more detail below with regard to FIG. 5.

At 406 a set of possible groups comprising the particular groups that are associated with one or more terms of the first received query 102 are determined. For example, the terms present in the first received query 102 may be compared with the terms associated with the canonical groups. Those groups in the canonical group data that have at least a partial match to the terms present in the received query 102 may be included in the set of possible groups. Those groups in the canonical group data that exhibit no match between the terms present in the received query 102 and the terms associated with the canonical group may be disregarded or otherwise omitted from the set of possible groups.

At 408 a score is determined for each group 134 in the set of possible groups. The score may be indicative of a correspondence between one or more terms in the first received query 102 and the one or more terms associated with the group 134. For example, a correspondence value may be determined that indicates an extent to which a match or partial match exists between one or more of the terms in the first received query 102 and one or more of the terms that are associated with the canonical groups. The correspondence value may be determined based on a weighted sum of the count of terms in the first received query 102 that correspond to terms in the particular canonical group.

At 410 a group 134 from the set of possible groups is selected as a selected group 134. In one implementation, the selected group 134 may be the canonical group that has a greatest score and exceeds a threshold score. For example, to be deemed a selected group 134, a minimum score threshold may be a value of 17. If the highest score in the set of possible groups is 18, then the group 134 associated with that score will be designated as the selected group 134. However, if the highest score is not greater than the minimum score threshold, the first query 102 may be directed to a default group 134.

Figure 5:
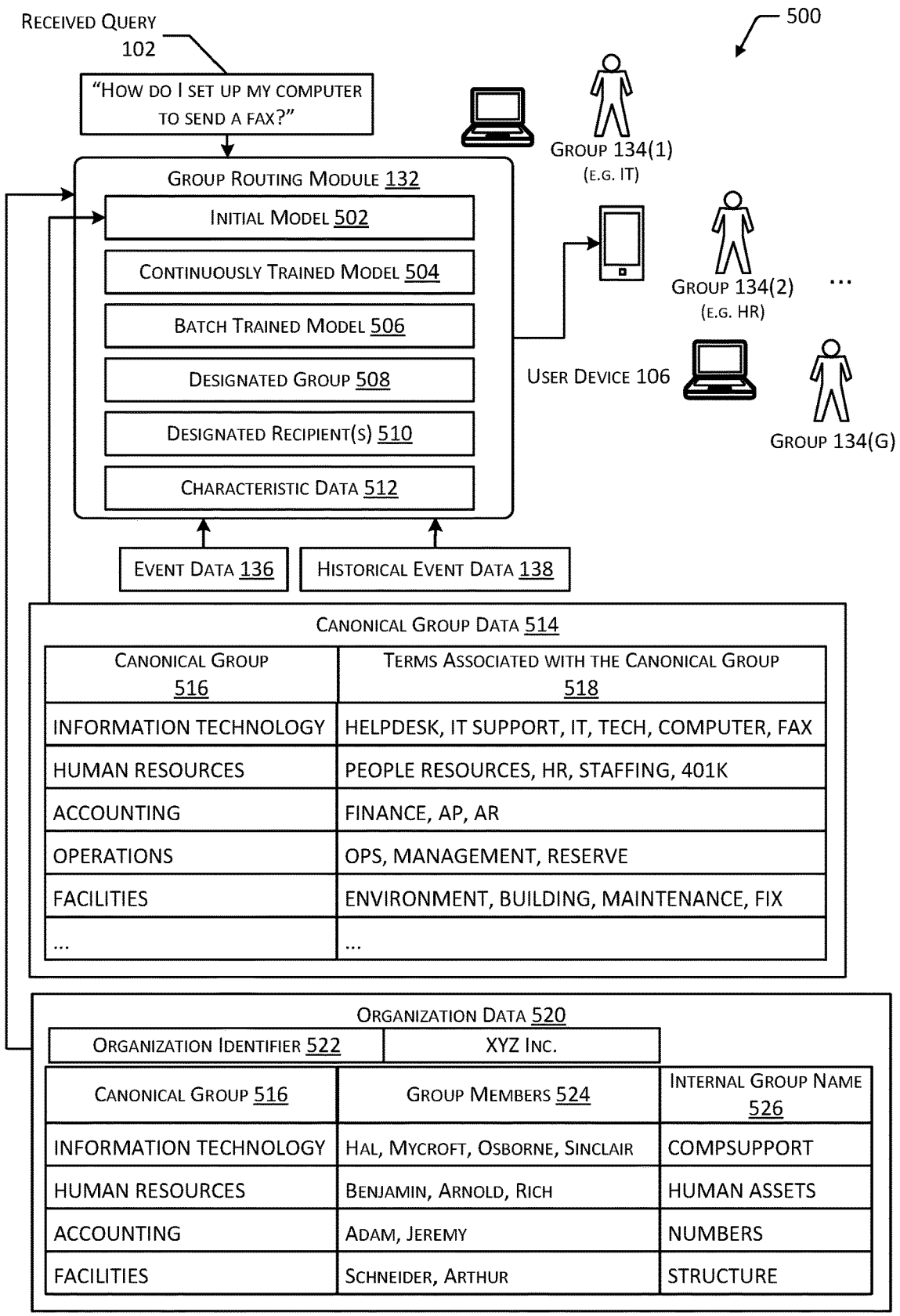
FIG. 5 depicts three models and associated data that may be used to route a query, according to one implementation.

FIG. 5 depicts three models and associated data that may be used by the group routing module 132 to route a received query 102, according to one implementation. During different phases of usage of the system 100 by an organization, received queries 102 are dynamically routed by the group routing module 132 using one or more of an initial model 502, a continuously trained model 504, or a batch trained model 506.

The group routing module 132 produces as output a designated group 508. The designated group 508 comprises data indicative of the group 134 to which a particular received query 102 or group of received queries 102 is to be routed to for further processing. For example, the designated group 508 may indicate a particular received query 102 is to be handled by the "information technology" group 134. In some implementations the designated group 508 may include information such as one or more designated recipients 510. For example, the designated recipients 510 for the "information technology" group 134 may be "Hal", "Mycroft", "Osborne", and "Sinclair".

The group routing module 132 may use characteristic data 512 to determine when to transition between using the continuously trained model 504 and the batch trained model 506. When one or more values of the characteristic data meet or exceed a transition threshold, the group routing module 132 may transition between the continuously trained model 504 and the batch trained model 506. For example, as the number of received queries 102 from a particular organization that are processed exceeds a threshold count, the group routing module 132 may transition from using the continuously trained model 504 to the batch trained model 506.

The initial model 502 may include canonical group data 514. The canonical group data 514 may comprise one or more canonical groups 516 and those terms associated with each of the canonical groups 518. For example, the canonical group 516 "information technology" is associated with terms "helpdesk", "IT support", "IT", "tech", "computer", and "FAX".

The canonical group data 514 may be generated based on information from a variety of difference sources, including the historical event data 138 associated with a plurality of different organizations. The canonical group data 514 is not associated with a particular organization. In some implementations, however, the canonical group data 514 may be associated with particular industries. For example, canonical group data 514 may be generated that is specific to healthcare, government, private business, publicly traded business, and so forth. The canonical group data 514 may also include manual entries or may be constructed using data from other sources.

Organization data 520 is specific to a particular organization. For example, the organization data 520 presented here is associated with an organization identifier 522 of "XYZ Inc." The organization data 520 provides an association between particular canonical groups 516 and group members 524. The group members 524 may be employees, contractors, vendors, or other individuals or organizations that are affiliated with the organization. The organization data 520 may also include internal group names 526. For example, XYZ Inc. may refer to their "information technology" group 134 as "Compsupport" while they refer to the "human resources" group 134 as "human assets", and so forth. In some implementations, the internal group names 526 may also be used as input to determine routing of the received queries 102.

Figure 6:
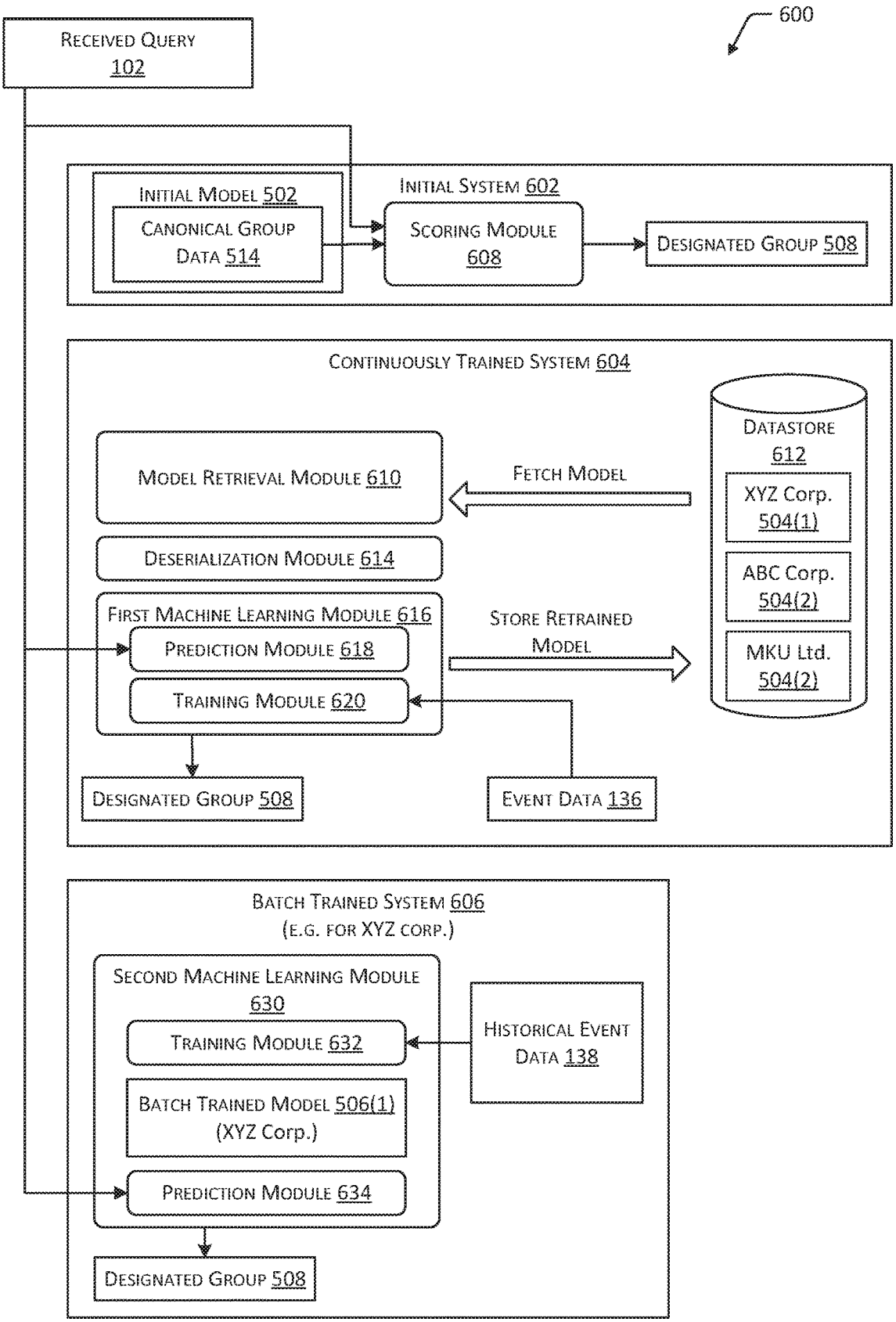
FIG. 6 depicts systems that utilize the three models to route queries, according to one implementation.

FIG. 6 depicts systems 600 that utilize the three models to determine a designated group 508 for a particular received query 102, according to one implementation. Each of the three models described above may be used by a respective system to generate a designated group 508. In some implementations these systems may comprise processors executing one or more computer-executable instructions.

An initial system 602 may use the initial model 502. A continuously trained system 604 may use the continuously trained model 504. A batch trained system 606 may use the batch trained model 506.

The initial system 602 uses as input the received query 102, or data based at least in part thereon. A scoring module 608 uses the received query 102 and the initial model 502 to select a designated group 508 from the canonical groups 516 indicated in the canonical group data 514. The scoring module 608 may generate a score for one or more of the canonical groups 516. If the highest scoring canonical group 516 exceeds a minimum score threshold, the highest scoring canonical group 516 is output as the designated group 508. In other implementations, other techniques may be used. For example, a classifier may be used to process the received query 102 and generate the designated group 508.

The initial system 602 is not specific to a particular organization. As described above, the initial model 502 may be generated based on data from one or more of a plurality of organizations, manual input, or other data sources. The initial system 602 provides a mechanism for at least some received queries 102 to be routed appropriately during the initial use of the system 100 by an organization, before sufficient event data 136 or historical event data 138 is available to train the other models.

The continuously trained system 604 may include a model retrieval module 610. The model retrieval module 610 may be used to retrieve the continuously trained model 504 associated with the received query 102. The continuously trained model 504 is specific to a particular organization. The model retrieval module 610 may fetch the continuously trained model 504 from a datastore 612. For example, this fetch may include transferring the continuously trained model 504 over a network connection from one server to another.

A deserialization module 614 deserializes the continuously trained model 504 for use by a first machine learning module 616.

The first machine learning module 616 may include a prediction module 618 and a training module 620. The first machine learning module 616 may utilize one or more elements from the TensorFlow open-source software library as promulgated at www.tensorflow.org, the OpenNN library promulgated at www.opennn.net, the Deeplearning4j library promulgated at deeplearning4j.org, and so forth. The first machine learning module 616 may utilize one or more neural networks, deep learning neural networks, convolutional neural networks, classifiers, and so forth.

The prediction module 618 is configured to accept the received query 102 as input and produce a designated group 508 as output. In some implementations, the prediction module 618 may produce a set of possible groups with associated confidence values. The set may be ranked, and the highest ranked group may be selected as the designated group 508.

The training module 620 may use event data 136 to retrain the continuously trained model 504. The retraining involves operation of the model retrieval module 610 to fetch the continuously trained model 504 from the datastore 612, and subsequent deserialization by the deserialization module 614. The retraining may occur on very short timescales, such as seconds or minutes. For example, as new event data 136 becomes available, the training module 620 may retrain the continuously trained model 504 based on the new event data 136.

As training continues, the size of the continuously trained model 504 increases. As a result, the continuously trained model 504 may exceed the storage limits of the datastore 612. Operation of the continuously trained model 504 uses network bandwidth for the fetches of the continuously trained model 504 from the datastore 612. As a result, network bandwidth usage, and latency when generating the designated group 508 may increase as the size of the model increases.

Operation of the continuously trained system 604 may result in potential race conditions. For example, if the training module 620 processes several pieces of event data 136 simultaneously or in quick succession, it is possible for one instance of training to interfere with the other. This has the potential to lose data associated with one of the event data 136. Various techniques may be used to prevent a race condition from overwriting data or otherwise losing data. However, these techniques may increase the complexity and computational cost associated with operation of the system 604, and may increase latency associated with operation of the continuously trained system 604.

The batch trained system 606 utilizes the batch trained model 506 for the particular organization associated with the received query 102. The batch trained system 606 may include a second machine learning module 630. The second machine learning module 630 may utilize one or more elements from the TensorFlow open-source software library as promulgated at www.tensorflow.org, the OpenNN library promulgated at www.opennn.net, the Deeplearning4j library promulgated at deeplearning4j.org, and so forth. The second machine learning module 630 may utilize one or more neural networks, deep learning neural networks, convolutional neural networks, classifiers, and so forth. In some implementations, the machine learning techniques used by the first machine learning module 616 may differ from the second machine learning module 630. For example, the first machine learning module 616 may utilize one or more classifiers while the second machine learning module 630 utilizes a deep learning neural network.

The second machine learning module 630 includes a training module 632. The training module 632 uses historical event data 138 to generate the batch trained model 506. For example, the historical event data 138 that is associated with the organization XYZ Inc. may be used to generate the batch trained model 506 that is specific to that organization. The training module 632 may be used to generate the batch trained model 506 at particular intervals, such as once daily. In some implementation, the training module 632 initiates generation of a new batch trained model 506 responsive to one or more occurrences. For example, addition of a group 134 or removal of a group 134 from an organization may trigger operation of the training module 632.

Once the batch trained model 506 has been generated, the prediction module 634 may use the batch trained model 506 to determine the designated group 508 associated with a particular received query 102. In some implementations, the prediction module 634 may produce a set of possible groups with associated confidence values. The set may be ranked, and the highest ranked group 134 may be selected as the designated group 508.

The batch trained system 606 offers several advantages over the continuously trained system 604. The batch trained model 506 may be stored and accessed differently, removing the need for a fetch over a network and deserialization. As a result, latency and bandwidth usage are decreased. The batch trained system 606 does not encounter the race condition issues described above. The batch trained system 606 is also more scalable, allowing for many more groups 134 to be supported, compared to the continuously trained system 604.

By using the techniques described above, each of the initial system 602, the continuously trained system 604, and the batch trained system 606 may be used during phases of operation in which they provide the greatest improvement to system performance. For example, during initial use when little or no event data 136 or historical event data 138 is available, the initial system 602 allows for at least some of the requests 102 to be routed to appropriate groups 134 for resolution. As event data 136 is produced, the designated group 508 provided by the continuously trained system 604 increases in confidence value and is subsequently used. As historical event data 138 is available, the batch trained system 606 may be trained using the historical event data 138, and routing determinations may be made by the batch trained system 606 while use of the continuously trained system 604 is discontinued.

Figure 7:
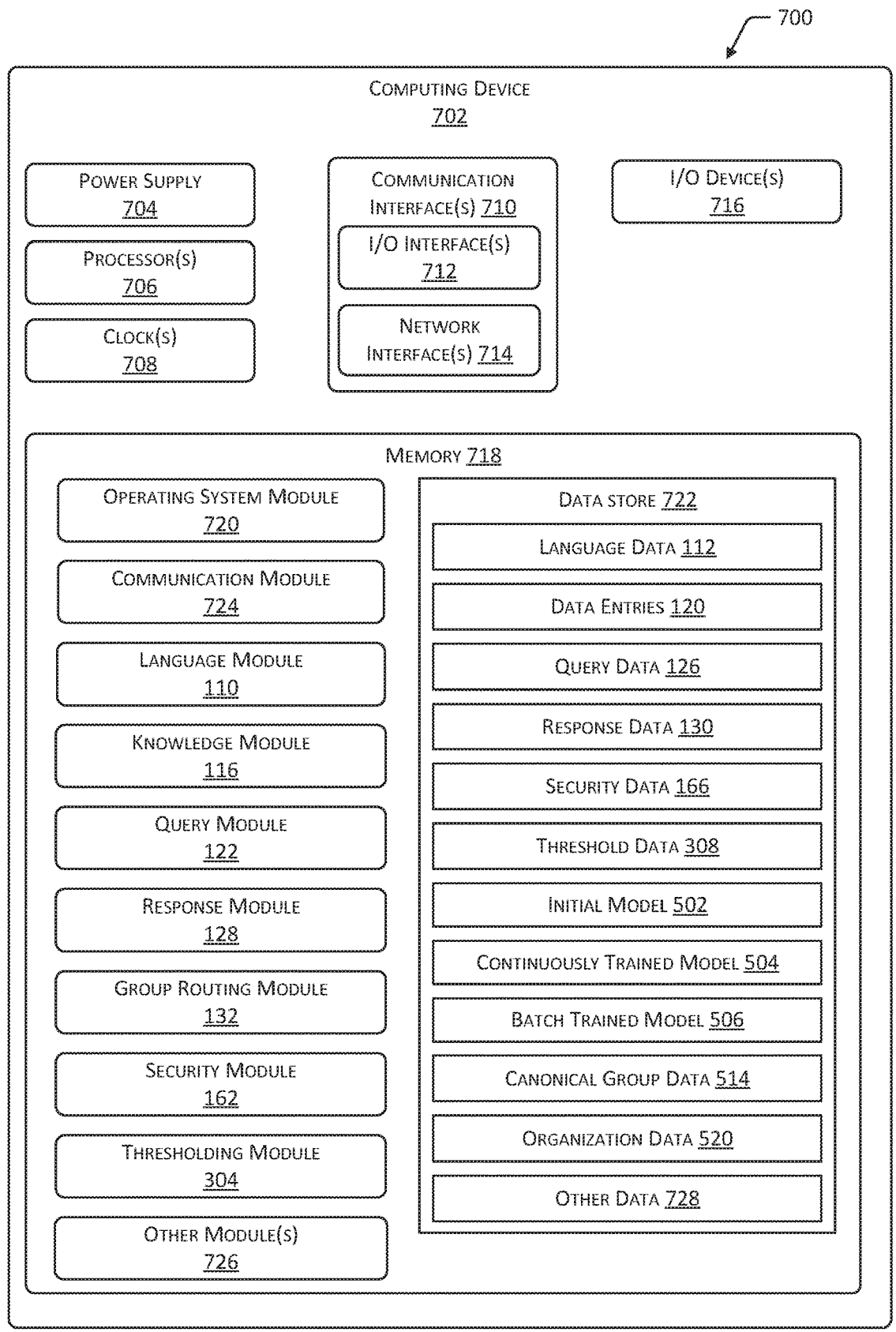
FIG. 7 is a block diagram depicting a computing device that provides for dynamic query routing, according to one implementation.

FIG. 7 is a block diagram 700 depicting a computing device 702 within the scope of the present disclosure. The computing device 702 may include, without limitation, one or more servers, personal computers, smartphones or other mobile devices, set-top boxes, tablet computers, wearable computers, automotive computers, and so forth. For example, the computing device 702 may include a query server 108, such as the query server 108 described with regard to FIGS. 1A, 1B, and 3. Additionally, while FIG. 7 depicts a single example computing device 702, in some implementations, computing functions described within the scope of the present disclosure may be performed by multiple computing devices 702, such as a distributed network of query servers 108 or other computing devices 702 in communication therewith. For example, a first computing device 702 may store one or more modules that may act upon data stored in a second computing device 702.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clocks 708 may provide information indicative of date, time, ticks, and so forth. For example, the processor(s) 706 may use data from the clock 708 to generate a timestamp, trigger a preprogrammed action, and so forth.

The computing device 702 may include one or more communication interface(s) 710, such as input/output (I/O) interface(s) 712, network interface(s) 714, and so forth. The communication interfaces 710 may enable the computing device 702, or components of the computing device 702, to communicate with other computing devices 702 or components thereof. The I/O interface(s) 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O device(s) 716. The I/O devices 716 may include any manner of input device or output device associated with the computing device 702 or with another computing device 702 in communication therewith. For example, I/O devices 716 may include touch sensors, keyboards, mouse devices, microphones, image sensors (e.g., cameras), scanners, displays, speakers, lights, haptic devices, printers, motion sensors, location sensors, and so forth. In some implementations, the I/O device(s) 716 may be physically incorporated with a computing device 702 or may be externally placed.

The network interface(s) 714 may be configured to provide communications between the computing device 702 and other devices, such as the I/O devices 716, routers, access points, user devices 106, other computing devices 702, and so forth. The network interface(s) 714 may include devices configured to couple to one or more networks, including local area networks (LANs), wireless LANs, wide area networks (WANs), wireless WANs, and so forth. For example, the network interfaces 714 may include computing devices 702 compatible with Ethernet, Wi-Fi, Wi-Fi Direct, Bluetooth, Bluetooth Low Energy, ZigBee, Z-Wave, 3G, 4G, 5G, LTE, and so forth.

The computing device 702 may include one or more busses or other internal communications hardware or software that allows for the transfer of data between the various modules and components of the computing device 702.

As shown in FIG. 7, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 722 and one or more of the following modules may also be stored in the memory 718. The modules may be executed as foreground applications, background tasks, daemons, and so forth. The data store 722 may use a flat file, database, linked list, tree, executable code, script, or other data structure to store information. In some implementations, the data store 722 or a portion of the data store 722 may be distributed across one or more other devices including other computing devices 702, network attached storage devices, and so forth.

A communication module 724 stored in the memory 718 may be configured to establish communications with user devices 106, query servers 108, or other computing devices 702. For example, the communication module 724 may be configured to receive queries from user devices 106 or other computing devices 702 and to provide responses 104 or other data to other computing devices 702.

The memory 718 may store the language module 110. The language module 110 may be configured to determine parameters of a received query 102. For example, a received query 102 may include one or more of alphanumeric data, video data, audio data, image data, or other types of data. The language module 110 may determine the types of data within the received query 102 and particular parameters associated with one or more types of data. For example, the language module 110 may determine particular words within a received query 102, such as by determining correspondence between alphanumeric data in the received query 102 and language data 112, which in some implementations may include dictionary data indicative of words of one or more natural languages. As another example, the language module 110 may include an optical character recognition (OCR) module configured to recognize text embedded within image data, an image recognition module configured to recognize characteristics of images, and so forth. As yet another example, the language module 110 may include a speech recognition, speech-to-text, or text-to-speech module configured to determine words present in audio data.

Based on the language data 112, the language module 110 may determine a weight value associated with one or more of the parameters determined in the received query 102. For example, the language data 112 may associate particular query parameters with corresponding weight values. Continuing the example, words within a received query 102 that are not indicative of the purpose of the received query 102 and may commonly occur in many queries may have a weight value of zero or a low weight value. Words that are indicative of the purpose of the received query 102 and do not commonly occur within other queries may have a high weight value. In some implementations, the language module 110 may be configured to remove one or more parameters from the received query 102 when generating an augmented query 114. For example, query parameters having a weight value of zero or a weight value less than a threshold weight value may be removed from the received query 102 to generate the augmented query 114. In some implementations, parameters that lack an associated weight value may be assigned a default weight value. In other implementations, parameters that lack an associated weight value may be disregarded.

In some implementations, the language data 112 may also associate one or more synonyms with particular query parameters. In such cases, the language module 110 may add one or more synonyms to the received query 102 to generate the augmented query 114. The augmented query 114 may include an indication of the weight value of each parameter. In some implementations, a synonym may have a weight value equal to the weight value of the query parameter for which the synonym was determined. In other implementations, a synonym may be associated with a different weight value than that of the query parameter for which the synonym was determined.

The memory 718 may also store the knowledge module 116. The knowledge module 116 may be configured to determine correspondence between an augmented query 114 and one or more data entries 120. For example, the augmented query 114 may include one or more parameters, such as the query parameters determined by the language module 110 and the parameters added to the received query 102 by the language module 110 to generate the augmented query 114. Each data entry 120 may also include one or more parameters. For example, a data entry 120 may include one or more of alphanumeric data, audio data, video data, image data, and so forth. Continuing the example, the data entry 120 may include one or more words or groups of words, one or more grammatical elements or arrangements of words, or other parameters that are included in the augmented query 114. Each parameter common between the data entry 120 and augmented query 114 may have an associated weight value, indicated in the language data 112. In some implementations, the knowledge module 116 may determine a correspondence value for each data entry 120 based on the common parameters for each data entry 120 that are shared with the augmented query 114, and the weight value for each parameter.

In some implementations, the knowledge module 116 may be configured to determine a subset of the data entries 120. The subset of data entries 120 may include all data entries 120 having a correspondence value greater than a threshold correspondence value. In other implementations, the knowledge module 116 may be configured to determine a selected quantity of data entries 120, such as the forty data entries 120 having the greatest forty correspondence values. In still other implementations, the subset of data entries 120 may be determined using a combination of threshold correspondence values. For example, the knowledge module 116 may determine the twenty data entries 120 having the greatest correspondence values, as long as each correspondence value exceeds a threshold correspondence value. In cases, where twenty of the data entries 120 do not have correspondence values that exceed the threshold correspondence value, only the data entries 120 having a correspondence value in excess of the threshold may be included in the subset.

The memory 718 may also include the query module 122. The query module 122 may be configured to determine, based on query data 126, the correspondence values for previous queries 302 received by the computing device 702 that are associated with the subset of data entries 120 determined by the knowledge module 116. For example, the query data 126 may associate particular previous queries 302 with particular data entries 120. The query module 122 may also determine correspondence between previous queries 302 and the augmented query 114. For example, each previous query 302 may include one or more parameters, such as words, grammatical structures, formats, images, audio data, and so forth. A particular previous query 302 may have one or more parameters in common with the augmented query 114. Based on the weight value for each common parameter, as indicated in the language data 112, a correspondence value for the previous query 302 may be determined.

The memory 718 may additionally store the response module 128. The response module 128 or the query module 122 may be configured to determine the particular data entry 120 that corresponds to the previous query 302 having the greatest correspondence value. The response module 128 may generate a response 104 based on the particular data entry 120 and response data 130. The response data 130 may include alphanumeric data, audio data, video data, image data, or other data that may be included in the response 104, one or more formats or arrangements of data, and so forth. For example, the response data 130 may include one or more fonts, templates, styles, and so forth that may be applied to the text of the particular data entry 120. As another example, the response data 130 may include instructional text to be provided in association with a hyperlink that may be used to access the particular data entry 120. In some implementations, different response data 130 may be associated with different data entries 120. For example, a response 104 associated with a first data entry 120 may include the full text of that data entry 120, presented in a particular font and arrangement indicated in the response data 130. A response 104 associated with a second data entry 120 may include instructional text and a hyperlink used to access the second data entry 120.

The memory 718 may include the group routing module 132. As described previously, the group routing module 132 may be used to route received queries 102 to particular groups 134 for the determination of response data 130. The group routing module 132 may include one or more of the initial system 602, the continuously trained system 604, or the batch trained system 606. The data store 722 may store one or more of the initial model 502, continuously trained model 504, batch trained model 506, canonical group data 514, organization data 520, and so forth.

The memory 718 may further store the security module 162. The security module 162 may determine correspondence between user data 164 determined from a received query 102, and security data 166, to determine whether a particular user device 106 is authorized to access a data repository 118 or data entry 120. For example, security data 166 may associate sources of queries with sources of data entries 120. A source of the received query 102 may be determined based on the user data 164. For example, the user data 164 may include an IP address or other network address or identifier. The security data 166 may associate various network addresses or identifiers with corresponding sources of queries, such as user accounts, user names or identifiers, user companies, and so forth. As such, the security data 166 may indicate particular sources of queries, such as user devices 106 or user accounts, that are authorized to access particular data entries 120 or particular sources of data entries 120. Based on correspondence between the user data 164 and the security data 166, the security module 162 may determine whether a user device 106 is authorized to access a specific data entry 120 or data repository 118 and either cause the user device 106 to be provided with access or prevent access by the user device 106. In some implementations, the security module 162 may generate one or more notifications indicative of a successful or unsuccessful attempt to access a particular data entry 120 or data repository 118. In some cases, notifications may be provided to an administrator associated with the computing device 702. In other cases, notifications may be provided to the user device 106 submitting the query. In some implementations, based on a lack of correspondence between the user data 164 and security data 166, the security module 162 may generate a response 104 to a received query 102 that indicates one or more of a lack of authorization to access applicable data sources, alternate means for resolving the query, contact information for individuals or groups of individuals that may assist with resolving the query or obtaining access to the data sources, and so forth. The particular content of such a response 104 may be determined based in part on the particular data entry 120 or data repository 118 associated with the received query 102, the response data 130, and the security data 166.

The memory 718 may also store the thresholding module 304. The thresholding module 304 may determine the quantity and characteristics (e.g., data size, data types, formats) of the data entries 120 and previous queries 302 stored in the data store 722. Based on the quantity and characteristics of the data entries 120 and previous queries 302, the thresholding module 304 may determine a first efficiency value indicative of the time or resources that may be used to determine correspondence between a query and the data entries 102, and a second efficiency value indicative of the time or resources that may be used to determine correspondence between the query and the previous queries 302. The efficiency values may include a length of time that may be used to process a query, a quantity of computing resources, such as processor cycles, that may be used to process the query, a quantity of external resources, such as electrical power, that may be used to process the query, and so forth. The manner in which the efficiency values are calculated may be determined based on one or more rules or algorithms indicated by threshold data 308. Based on the quantity and characteristics of the data entries 120 and previous queries 302, the thresholding module 304 may generate a thresholding determination 306 indicating whether a query is first analyzed by determining correspondence between the query and the data entries 120, or by determining correspondence between the query and the previous queries 302. The threshold data 308 may include data indicative of relationships between the previous queries 302 and data entries 120 or between the first and second efficiency values that may determine whether initially analyzing a query using the data entries 120 or the previous queries 302 would consume less time or resources.

Other modules 726 may also be present in the memory 718. For example, encryption modules may be used to encrypt and decrypt communications between computing devices 702. User account modules may be configured to receive and process user data 164. Administrator modules may be used to modify default settings and preferences. Machine learning modules may be configured to determine relationships between queries and data entries 120 and between query parameters and language data 112. User interface modules may be used to provide user interfaces that may receive queries, user data 164, feedback data, and so forth. Feedback modules may receive feedback data and determine correspondence between the feedback data and threshold feedback value, which may in turn determine whether a received query 102 is stored as additional query data 126.

Other data 728 within the data store 722 may include default configurations and settings associated with computing devices 702. Other data 728 may also include security data, such as encryption keys and schema, access credentials, and so forth. Other data 728 may further include user interface content and formats, algorithms used to process and analyze feedback data, and so forth.

In different implementations, different computing devices 702 may have different capabilities or capacities. For example, query servers 108 may have significantly more processor 706 capability and memory 718 capacity compared to the processor 706 capability and memory 718 capacity of user devices 106.

Figure 8:
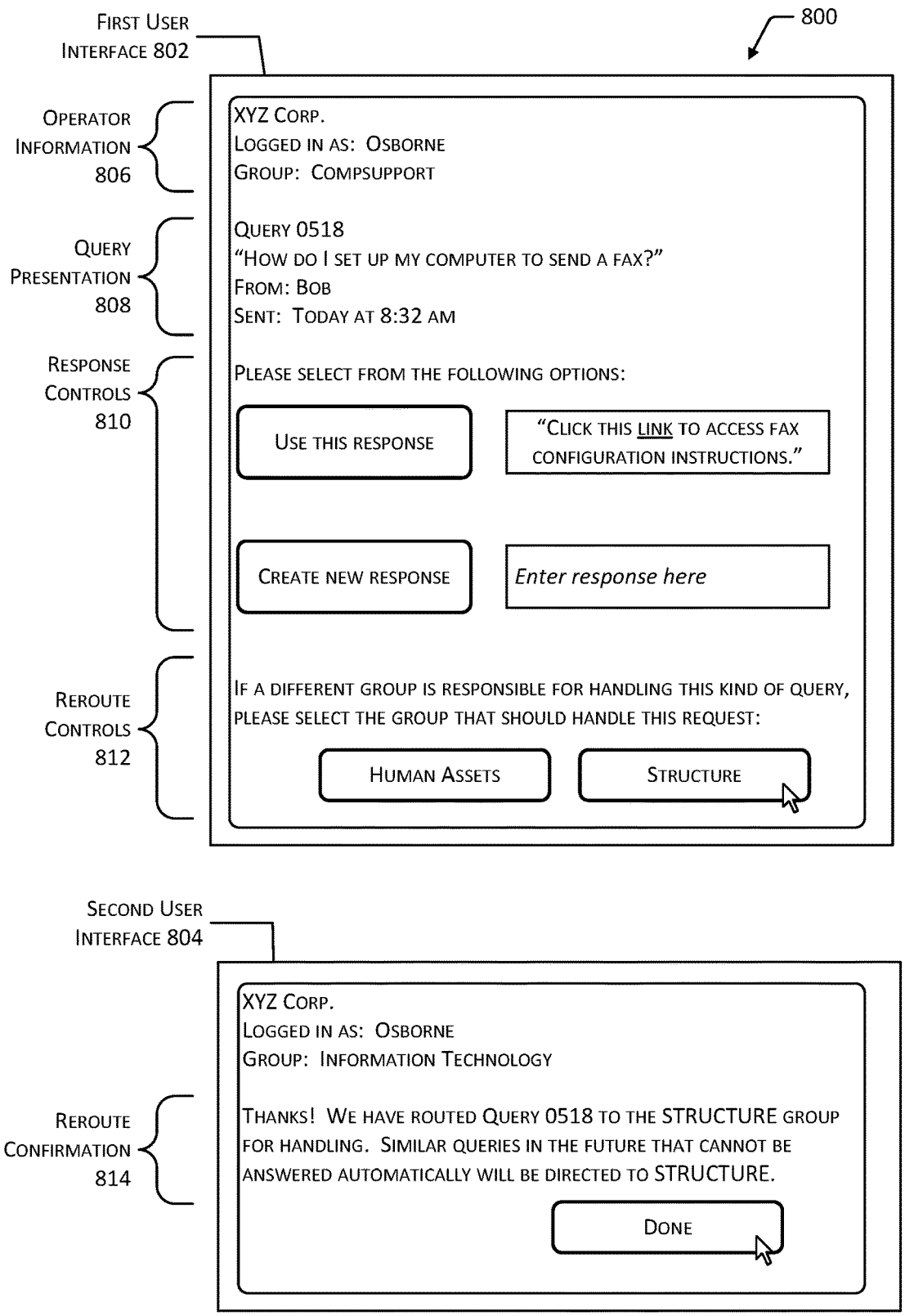
FIG. 8 depicts user interfaces that may be provided to group members to respond to or re-route a query, according to one implementation.

FIG. 8 depicts user interfaces 800 that may be provided to group members 524 to respond to or re-route a query 102, according to one implementation. For example, the user interfaces 800 may be presented on user devices 106 that are utilized by the group members 524.

A first user interface 802 presents a user interface containing information about a received query 102 that has been routed to group member 524. An operator information 806 section includes information such as the name of the organization, login credentials of the group member 524, and the group 134 that the group member 524 is processing received queries 102. For example, in some situations a single person may be a member of two or more groups 134. Continuing the example, the person may select which group 134 they are handling received queries 102 for.

The first user interface 802 includes a query presentation 808 portion that provides information about the particular received query 102. For example, the received query 102 is the text "How do I set up my computer to send a fax?". Information about the user may be included in some implementations. For example, we see here that the query 102 is from "Bob" and was sent today.

The first user interface 802 includes response controls 810. The response controls 810 allow the group member 524 to take various actions with respect to the query 102. For example, the system 100 may have determined a possible response 104, but that response may have had a confidence value or other metric that was below a threshold value and thus was not sent automatically or otherwise required human intervention. The group member 524 may select the "use this response" control to provide a response 104 that is based on this possible response 104. The user interface 802 includes a control to "create new response" that allows the group member 524 to create a response to the received query 102.

The first user interface 802 may include reroute controls 812. The reroute controls 812 allow the group member 524 to direct the received query 102 to a different group 134. For example, in some situations the group routing module 132 may incorrectly route a received query 102. The reroute controls 812 allow the group member 524 to manually select another group 134. In some implementations the groups 134 may be listed in a predetermined order, or may be ranked based on probability or confidence value associated with those groups 134 for the particular received query 102.

A second user interface 804 shows the user interface after selection of the reroute control 812 to direct the received query 102 to the "STRUCTURE" group. The second user interface 804 presents a reroute confirmation 814 that indicates that the query has been rerouted to the "STRUCTURE" group 134.

Once the group member 524 has completed reviewing the second user interface 804, they may proceed to a third user interface (not shown) that presents another received query 102.

Figure 9:
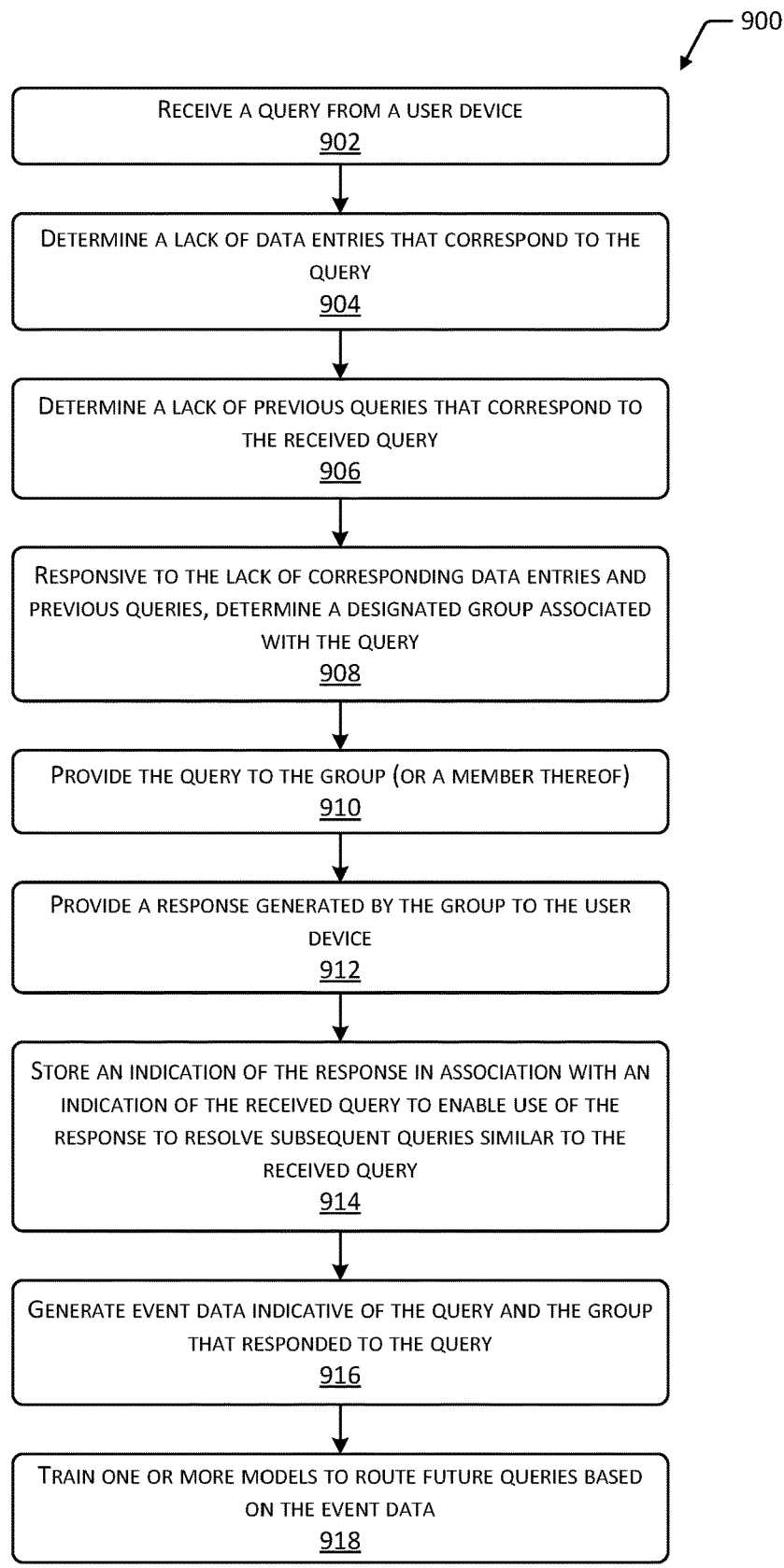
FIG. 9 is a flow diagram illustrating a method for routing a query to one or more human users in a particular group, according to one implementation.

FIG. 9 is a flow diagram 900 illustrating a method for routing a query to one or more human users in a particular group 134, according to one implementation. The method may be implemented at least in part by the query server 108.

At 902 a query 102 is received from a user device 106. The received query 102 may include various parameters, such as keywords, groups of words, arrangements of words, formats of words or letters, punctuation, and so forth.

At 904 a lack of data entries 120 that correspond to the query is determined. For example, in some cases, for a particular received query 102, no existing data entry 120 may include parameters that correspond to those of the received query 102 within a threshold level of confidence.

At 906 a lack of previous queries 302 that correspond to the received query 102 is determined. Continuing the example, in some cases, for a particular received query 102, no existing previous query 302 may include parameters that correspond to those of the received query 102 within a threshold level of confidence.

Responsive to the lack of corresponding data entries 120 and previous queries 302, at 908 a designated group 508 is determined that is associated with the received query 102.

At 910 the received query 102 is provided to the designated group 508, or a group member 524 of that group 134.

At 912 the response 104 generated by the group member 524 is provided to the user device 106. In some cases, the response 104 may include a data entry 120 generated by the group member 524, the data entry 120 including information responsive to the received query 102.

At 914 an indication of the response 104 that is associated with an indication of the received query 102 is stored, to enable the response 104 to be used to resolve subsequent queries similar to the received query 102. For example, if a subsequent query having similar parameters is received, a data entry 120 generated by the user(s) may be used to form the response 104 in place of or in addition to providing the query to the corresponding group of users.

At 916 event data 136 is generated that is representative of the received query 102 and the group 134 that responded to the received query 102.

At 918 one or more models are trained to route future received queries 102 based at least in part on the event data 136. For example, as described above, the continuously trained system 604 or the batch trained system 606 may be trained using the event data 136 or historical event data 138, respectively. Subsequent received queries 102 having the term "company policy" would then be routed to the appropriate group 134, independent of whether the queries include the terms "computer" and "configure".

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
receive a first query from a first user device;
determine, using a first model, a first group and a first confidence value that the first query is associated with the first group;
determine the first confidence value is less than a first threshold;
in response to the first confidence value being less than the first threshold, access initial model data that associates a set of possible groups with one or more terms of the first query;
determine, for each group in the set of possible groups, a second confidence value that is indicative of correspondence between the first query and the one or more terms of the initial model data;
determine a first group of the set of possible groups that is associated with a greatest second confidence value that exceeds a second threshold;
route the first query to the first group; and
receive response data generated by one or more resources, wherein the response data is indicative of the first group.

2. The system of claim 1, further comprising instructions executed on the one or more hardware processors to:
generate event data comprising:
at least a portion of the first query, and
data indicative of the first group; and
train, within a first period of time, the first model using the event data to associate the at least a portion of the first query with the first group.

3. The system of claim 2, further comprising instructions executed on the one or more hardware processors to:
train, within a second period of time that is greater than the first period of time, a second model using the event data to associate the at least a portion of the first query with the first group;
determine one or more of:
a count of queries processed by the system; or
a length of time associated with use of the system to process queries;
determine that the one or more of the count of queries or the length of time exceeds a transition threshold;
receive a second query from one or more of the first user device or a second user device;
in response to the one or more of the count of queries or the length of time exceeding the transition threshold, use the second model to determine a second group and a second confidence value that the second query is associated with the second group;
determine the second confidence value is greater than the second threshold; and
route the second query to the second group.

4. The system of claim 3, wherein the count of queries includes one or more of:
a count of queries processed by the system,
a count of queries processed by the system that are associated with a particular group, or
a count of queries that are routed using the first model.

5. A method performed by a system, the method comprising:
generating a first model using a first machine learning technique;
generating a second model using a second machine learning technique that differs from the first machine learning technique;
receiving a first query;
determining that one or more of a count of queries processed by the system or a length of time associated with use of the system to process queries is less than a first threshold;
in response to the one or more of the count of queries or the length of time being less than the first threshold, using the first model to determine a first group and first confidence value that the first query is associated with the first group;
generating response data that is responsive to the first query and indicative of a group associated with the response data; and
sending the response data.

6. The method of claim 5, the generating the response data comprising:
accessing a data repository comprising information related to operation of an organization;
determining a subset of the information that is associated with the first group; and
based on the first query, retrieving the response data from the subset of the information.

7. The method of claim 5, wherein the first query comprises a request, from a first user, that is related to operation of an organization, and the response data comprises information that is one or more of sent to the first user or causes intitation of an action.

8. The method of claim 5, further comprising:
generating event data comprising:
at least a portion of the first query, and
data indicative of the group associated with the response data;
determining that the first group differs from the group associated with the response data; and
training the first model using the event data.

9. The method of claim 5, further comprising:
determining historical event data comprising:
at least a portion of a plurality of queries, and
data indicative of the group that provided the response data associated with individual ones of the plurality of queries;
training the second model using at least a portion of the historical event data, wherein the training associates at least a portion of in the plurality of queries with one or more groups;
determining that the one or more of the count of queries or the length of time is greater than the first threshold; and
in response to the one or more of the count of queries or the length of time being greater than the first threshold, discontinuing use of the first model for subsequent queries.

10. The method of claim 5, further comprising:
generating a third model based on a predetermined list of terms that are associated with particular groups;
determining the first confidence value is less than a second threshold; and
in response to the first confidence value being less than the second threshold, using the third model to determine a second group that is associated with the first query.

11. The method of claim 9, further comprising:
determining the one or more of the count of queries or the length of time based at least in part on the historical event data.

12. The method of claim 9, further comprising:
determining, security data indicative of a particular organization that is associated with the first query, the first model, and the second model;
selecting the first model based at least in part on the security data; and
selecting the second model based at least in part on the security data.

13. The method of claim 5, wherein the count of queries includes one or more of:
a count of queries that have been processed by the system,
a count of queries that have been processed by the system that are associated with a particular group, or
a count of queries that are routed using the first model.

14. The method of claim 5, the determining the first group that is associated with the first query comprising:
accessing data indicative of one or more terms that are associated with particular groups;
determining a set of possible groups that are associated with the one or more terms that correspond to the first query;
determining, for each group in the set of possible groups, a score that is indicative of correspondence between one or more terms in the first query and the one or more terms associated with the group; and
determining that the first group is associated with a greatest score that exceeds a second threshold.

15. The method of claim 14, further comprising:
determining a set of available groups;
determining, for each group in the set of available groups:
a count of terms in the first query that correspond to terms associated with the group, and
a weighted sum of the count of terms; and
determining the set of possible groups from within the set of available groups based on the weighted sum exceeding a third threshold.

16. The method of claim 10, further comprising:
determining, for the first query, security data indicative of a first organization that is associated with the first query; and
selecting the first model based at least in part on the security data;
wherein the third model is based at least in part on historical event data obtained from a second organization that differs from the first organization.

17. A method performed by a system, the method comprising:
receiving a first query;
determining, using a first model, a first group associated with the first query;
generating first response data that is responsive to the first query and indicative of the first group;
generating historical event data comprising:
at least a portion of the first query; and
data indicative of the first group associated with the first response data;
training a second model using at least a portion of the historical event data;
determining that one or more of a count of queries processed by the system or a length of time associated with use of the system to process queries is greater than a first threshold;
receiving, by the system, a second query;
in response to the one or more of the count of queries or the length of time exceeding the first threshold, using the second model to determine a second group associated with the second query; and
generating second response data that is responsive to the second query and indicative of the second group.

18. The method of claim 17, wherein the count of queries includes one or more of:
a count of queries that have been processed using the first model, or
a count of queries that have been processed that are associated with a particular group.

19. The method of claim 17, further comprising:
receiving a third query including one or more terms;
determining, using one of the first model or the second model, a third group associated with the third query and a confidence score that the third group is associated with the third query;
determining that the confidence score is less than a second threshold;
in response to the confidence score being less than the second threshold, accessing data that associates the one or more terms with a set of groups;
determining, for each group in the set of groups, a score that is indicative of correspondence between the third query and the one or more terms associated with the group;
determining a fourth group from the set of groups that is associated with a greatest score that exceeds a third threshold; and
generating third response data that is responsive to the third query and indicative of the fourth group.

20. The method of claim 17, the generating one or more of the first response data or the second response data further comprising:
accessing a data repository comprising information related to operation of an organization;
determining a subset of information in the data repository based on an individual group associated with an individual one of a plurality of queries; and
retrieving from the subset of information the one or more of the first response data or the second response data.

* * * * *

UNITED STATES PATENT AND TRADEMARK OFFICE
CERTIFICATE OF CORRECTION

PATENT NO. : 10,795,886 B1
APPLICATION NO. : 15/942342
DATED : October 6, 2020
INVENTOR(S) : Rajhans Samdani et al.

Page 1 of 1

It is certified that error appears in the above-identified patent and that said Letters Patent is hereby corrected as shown below:

In the Claims
Column 34, Claim 9, Line 51:
Currently reads: "least a portion of in the plurality of queries".
Where it should read: --least a portion of the plurality of queries--.

Signed and Sealed this
Twenty-fourth Day of November, 2020

Andrei Iancu
*Director of the United States Patent and Trademark Office*